United States Patent
Park et al.

(10) Patent No.: US 10,439,780 B2
(45) Date of Patent: Oct. 8, 2019

(54) METHOD FOR MULTI-USER TRANSMISSION AND RECEPTION IN WIRELESS COMMUNICATION SYSTEM AND DEVICE FOR SAME

(71) Applicant: LG ELECTRONICS INC., Seoul (KR)

(72) Inventors: Eunsung Park, Seoul (KR); Wookbong Lee, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/548,706

(22) PCT Filed: Nov. 30, 2015

(86) PCT No.: PCT/KR2015/012940
§ 371 (c)(1),
(2) Date: Aug. 3, 2017

(87) PCT Pub. No.: WO2016/125998
PCT Pub. Date: Aug. 11, 2016

(65) Prior Publication Data
US 2017/0373808 A1      Dec. 28, 2017

Related U.S. Application Data

(60) Provisional application No. 62/111,675, filed on Feb. 4, 2015, provisional application No. 62/143,798, filed (Continued)

(51) Int. Cl.
*H04L 5/00* (2006.01)
*H04L 27/26* (2006.01)
(Continued)

(52) U.S. Cl.
CPC ............ *H04L 5/005* (2013.01); *H04L 5/0023* (2013.01); *H04B 7/0413* (2013.01);
(Continued)

(58) Field of Classification Search
CPC ..... H04W 84/12; H04W 84/10; H04W 84/02; H04L 5/0048; H04L 5/0007; H04L 5/005;
(Continued)

(56) References Cited

U.S. PATENT DOCUMENTS 8,885,755 B2 *   11/2014   Shi ..................... H04B 7/0413
                                                        375/267
2009/0116374 A1 *  5/2009  Henriksson ......... H04L 27/2613
                                                        370/203
(Continued)

FOREIGN PATENT DOCUMENTS

WO    2014151546    9/2014
WO    2014183059    11/2014

OTHER PUBLICATIONS

Frequency Offset Estimation and Training Sequence Design for MIMO OFDM (Year: 2008).*
(Continued)

*Primary Examiner* — Jeffrey M Rutkowski
*Assistant Examiner* — Luna Weissberger
(74) *Attorney, Agent, or Firm* — Lee Hong Degerman Kang Waimey

(57) ABSTRACT

Disclosed are a method for multi-user transmission and reception in a wireless communication system and a device for same. More particularly, a method for performing multi-user (MU) transmission by a station (STA) device in a wireless communication system comprises the steps of: generating a high efficiency-long training field (HE-LTF) sequence in a frequency domain in accordance with an MU transmission bandwidth; and transmitting a physical proto-
(Continued)

| L-STF | L-LTF | L-SIG | HE-SIG A | | | | |
|-------|-------|-------|----------|--------|--------|--------|------|
| L-STF | L-LTF | L-SIG | HE-SIG A | HE-SIG B | HE-STF | HE-LTF | Data |
| L-STF | L-LTF | L-SIG | HE-SIG A | | | | |
| L-STF | L-LTF | L-SIG | HE-SIG A | | | | | col data unit (PPDU) which comprises one or more symbols to which the HE-LTF sequence is mapped, wherein the HE-LTF sequence can be generated by multiplying one row of a P matrix to a length unit of a row of the P matrix in a predetermined sequence.

11 Claims, 13 Drawing Sheets

Related U.S. Application Data on Apr. 6, 2015, provisional application No. 62/147,563, filed on Apr. 14, 2015.

(51) Int. Cl.
  *H04W 84/12* (2009.01)
  *H04B 7/0413* (2017.01)
  *H04L 29/08* (2006.01)

(52) U.S. Cl.
  CPC .......... *H04L 5/0037* (2013.01); *H04L 27/266* (2013.01); *H04L 27/2613* (2013.01); *H04L 27/2672* (2013.01); *H04L 69/323* (2013.01); *H04L 69/324* (2013.01); *H04W 84/12* (2013.01)

(58) Field of Classification Search
  CPC . H04L 5/0023; H04L 5/0037; H04L 27/2613; H04L 27/2672; H04L 27/266; H04L 27/261; H04L 27/2602; H04L 27/2601; H04L 27/2669; H04L 27/2668; H04L 27/2655; H04L 27/2647; H04L 69/323; H04L 69/322; H04L 69/32; H04B 7/0413; H04B 7/04; H04B 7/02
  USPC .......................................................... 370/329
  See application file for complete search history.

(56) References Cited

U.S. PATENT DOCUMENTS

| | | | | |
|---|---|---|---|---|
| 2011/0142020 A1* | 6/2011 | Kang | .................... | H04L 5/0048 370/338 |
| 2011/0170627 A1* | 7/2011 | Kwon | ................. | H04L 25/0204 375/295 |
| 2012/0127940 A1* | 5/2012 | Lee | ........................ | H04L 5/0023 370/329 |
| 2013/0301551 A1* | 11/2013 | Ghosh | ................. | H04W 72/042 370/329 |
| 2013/0315326 A1* | 11/2013 | Shi | ........................ | H04B 7/0413 375/267 |
| 2015/0023335 A1* | 1/2015 | Vermani | .............. | H04B 7/0452 370/338 |

OTHER PUBLICATIONS

Concerning the Block-Diagonal Structure of the Cyclic Shift Matrix Under Generalized Discrete Orthogonal Transformers (Year: 1978).*
PCT International Application No. PCT/KR2015/012940, International Search Report dated Feb. 29, 2016, 2 pages.
European Patent Office Application Serial No. 15881316.2, Search Report dated Sep. 13, 2018, 10 pages.

* cited by examiner

【FIG. 1】
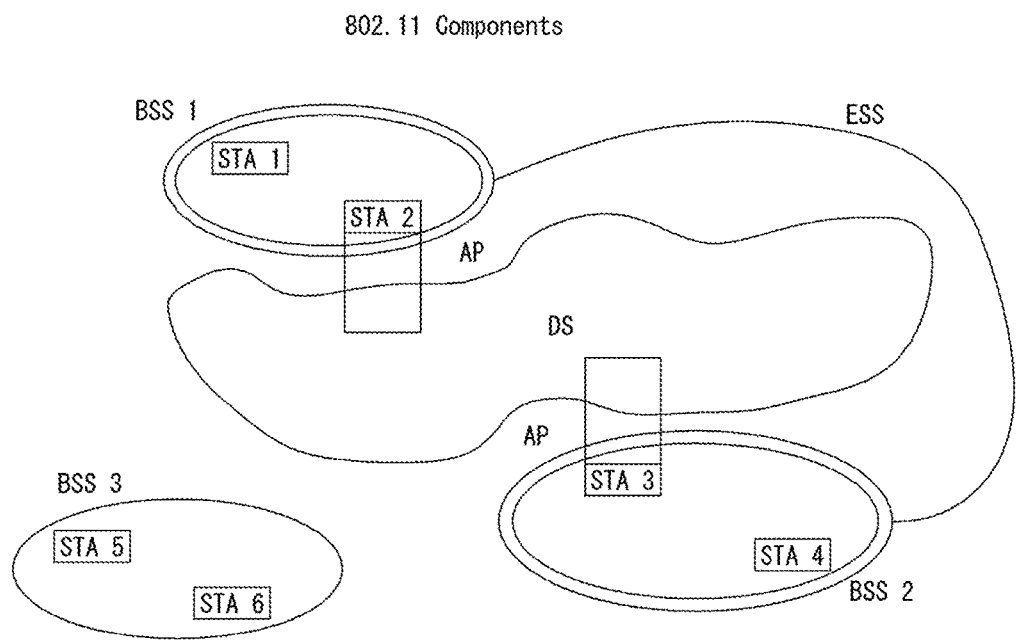
【FIG. 2】
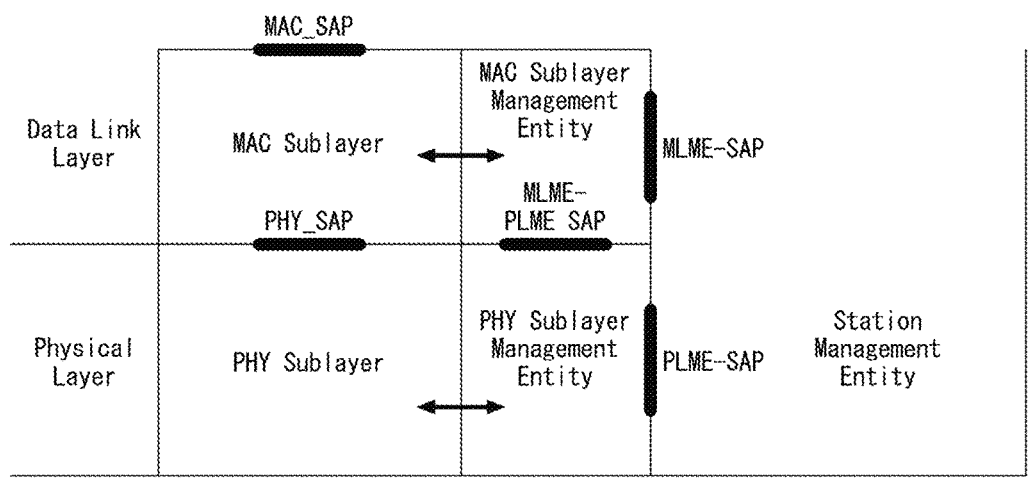

[FIG. 3]
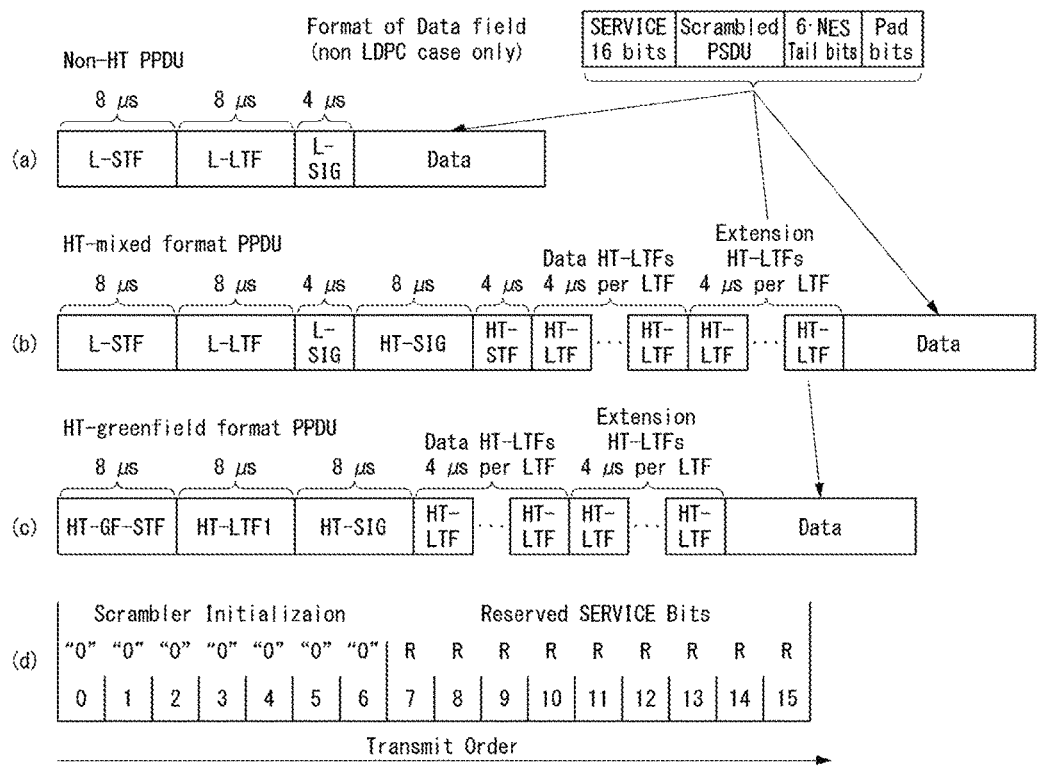
[FIG. 4]
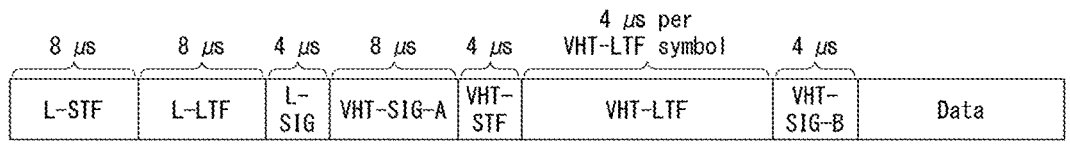

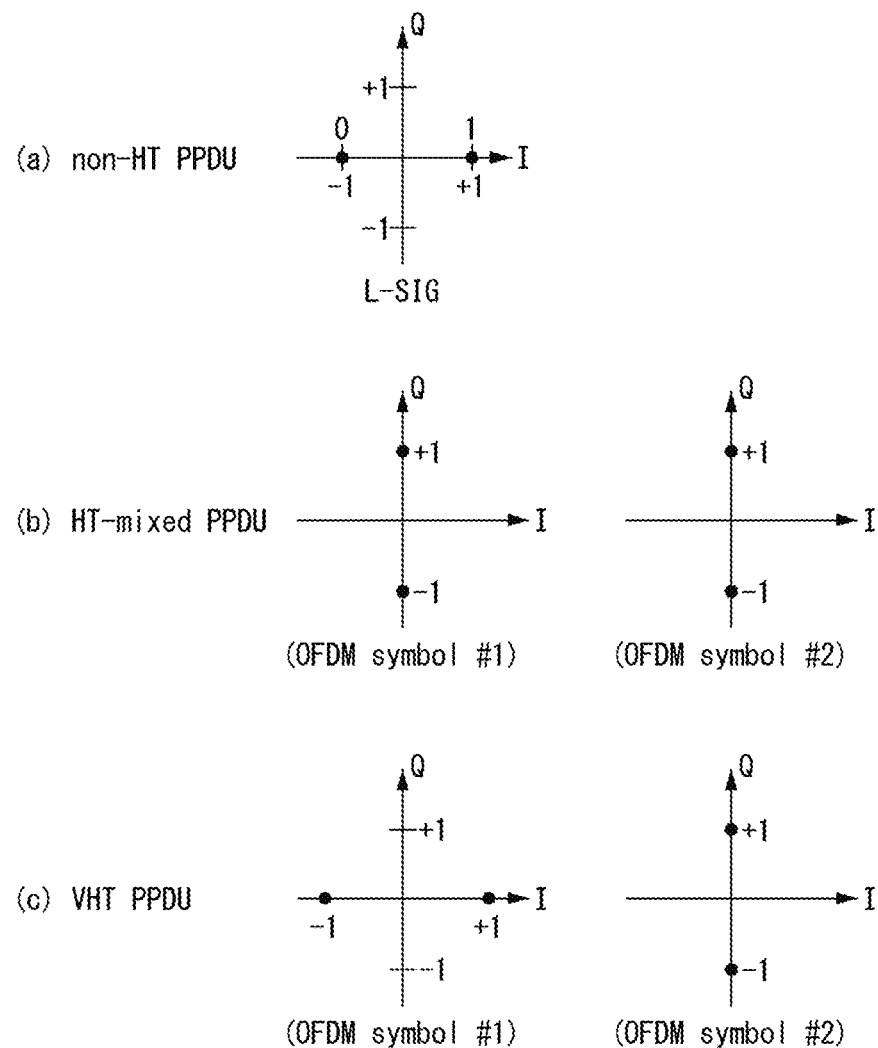
[FIG. 5]

[FIG. 6]
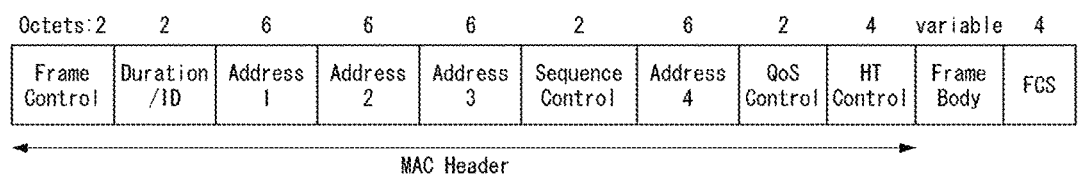
[FIG. 7]
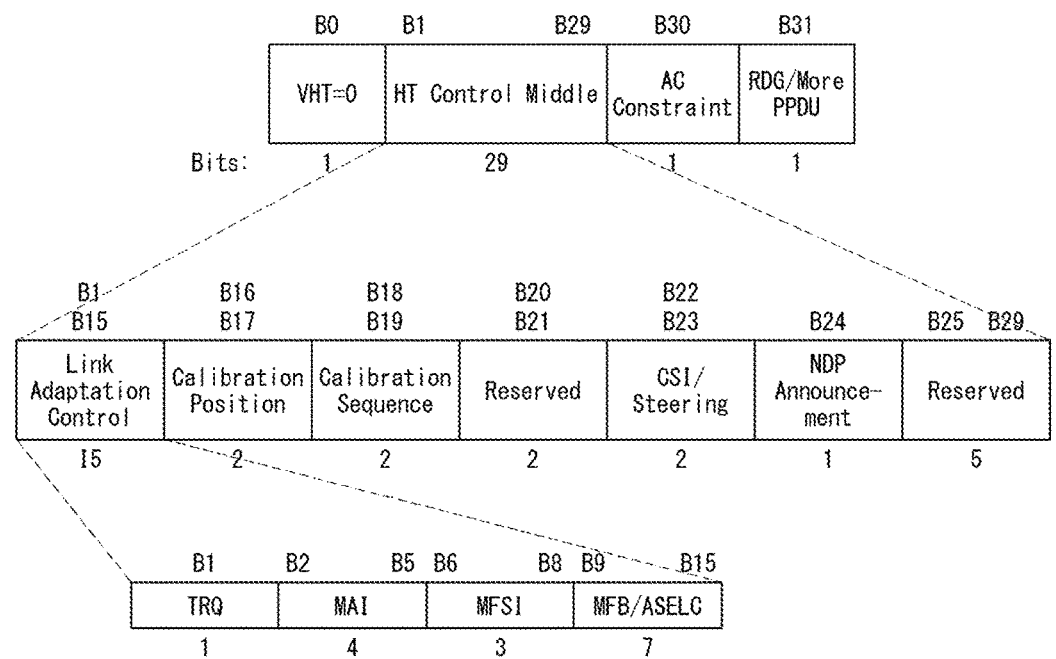

[FIG. 8]
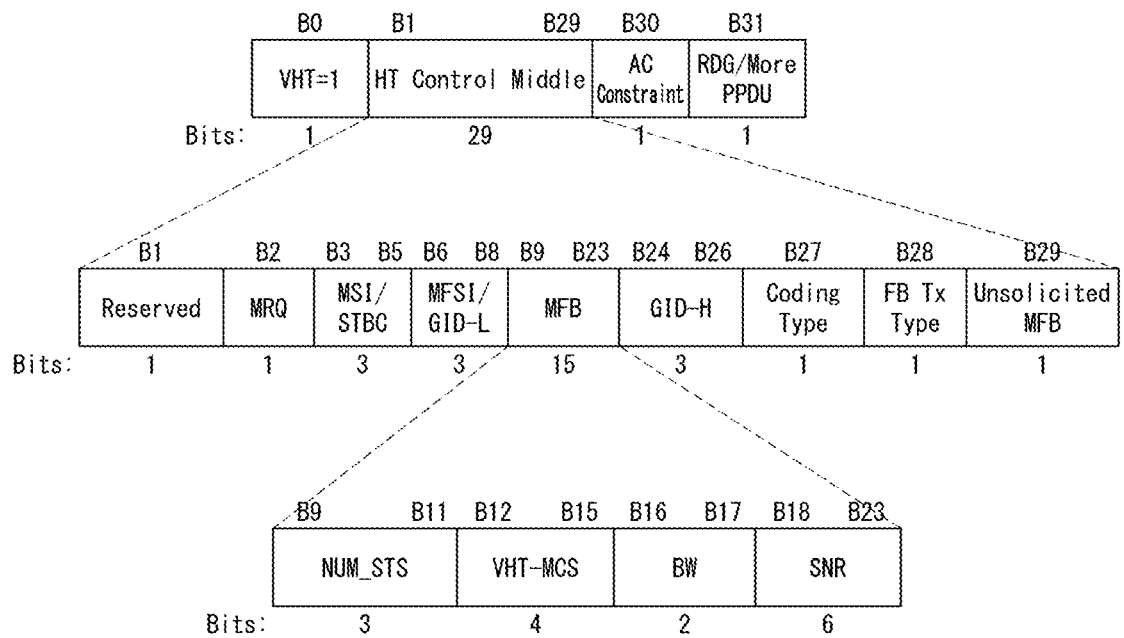
[FIG. 9]
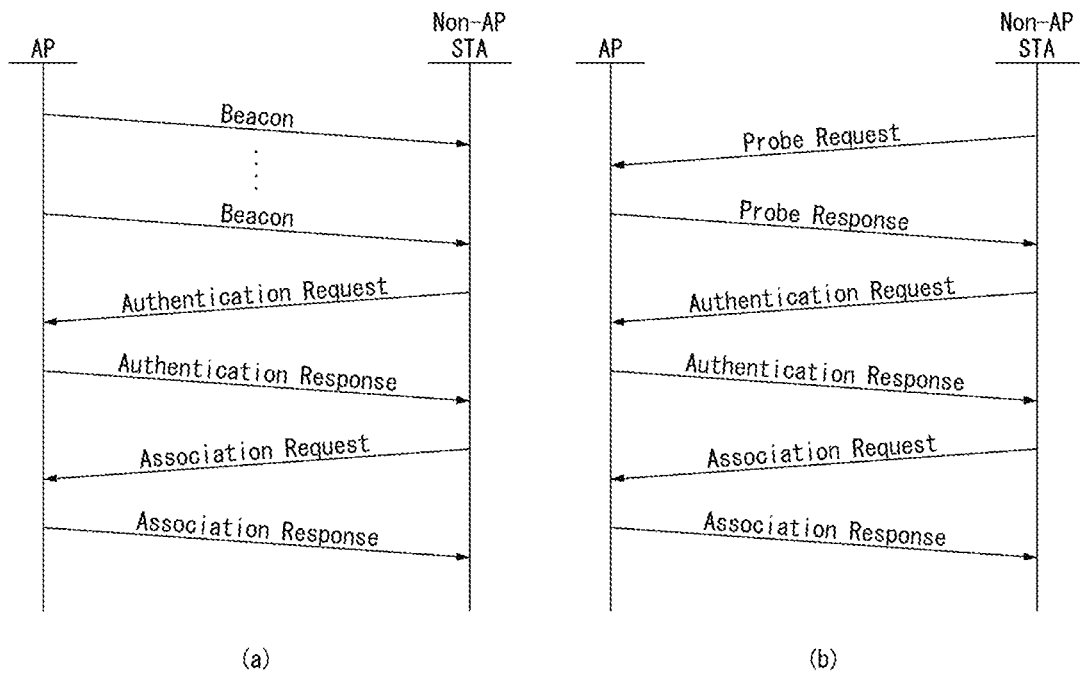
(a)　　　　　　　　　　　　(b)

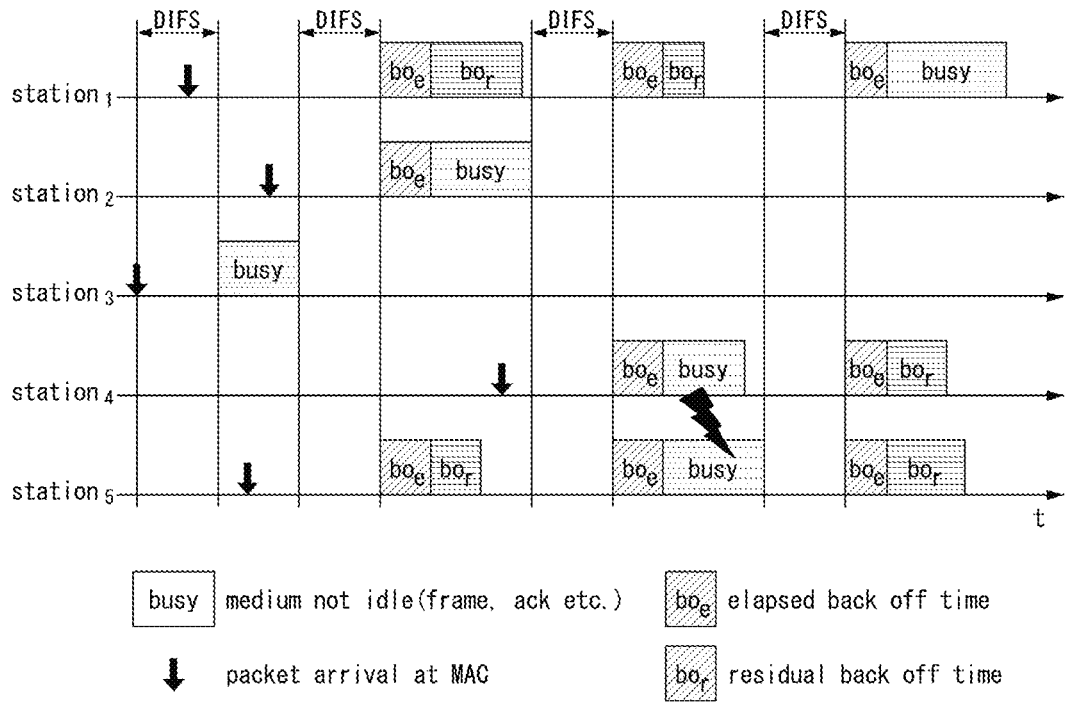

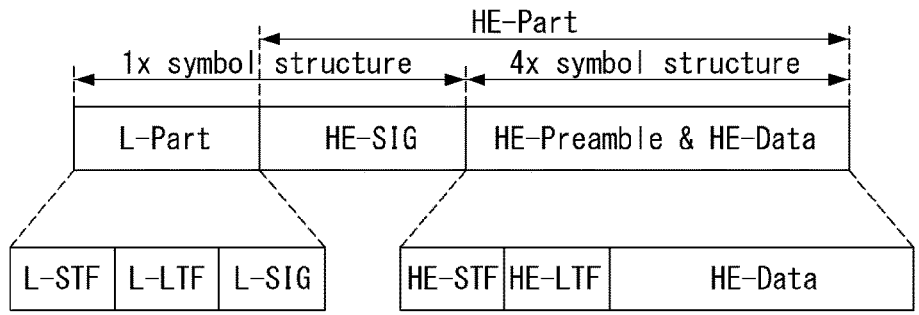

[FIG. 16]
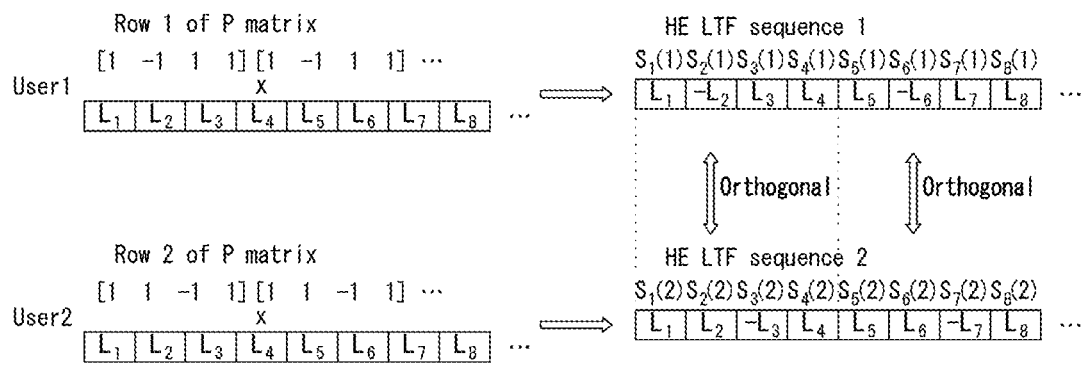
[FIG. 17]
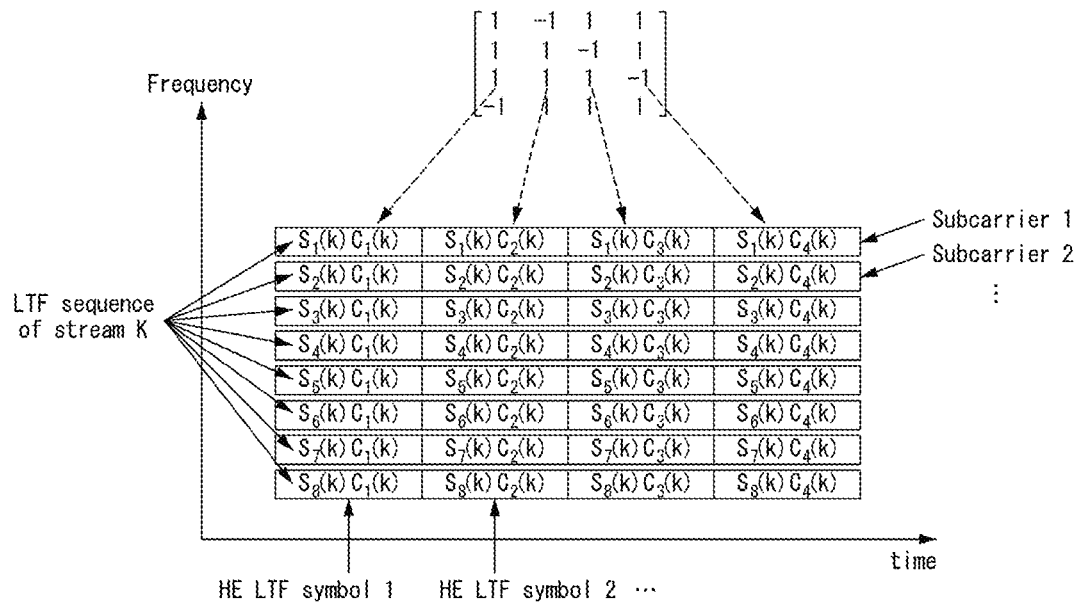

[FIG. 18]
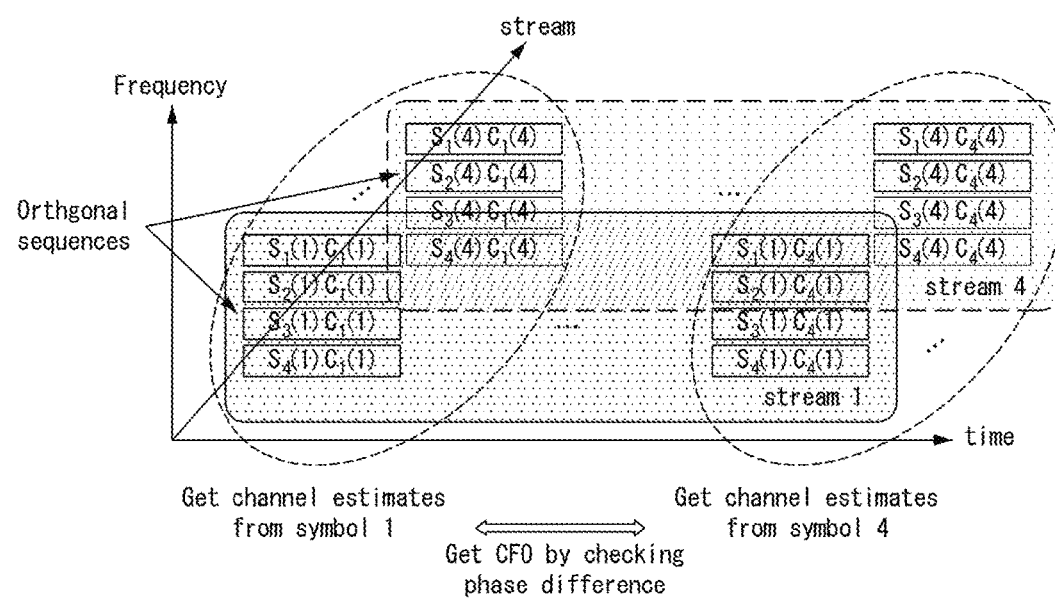

[FIG. 19]
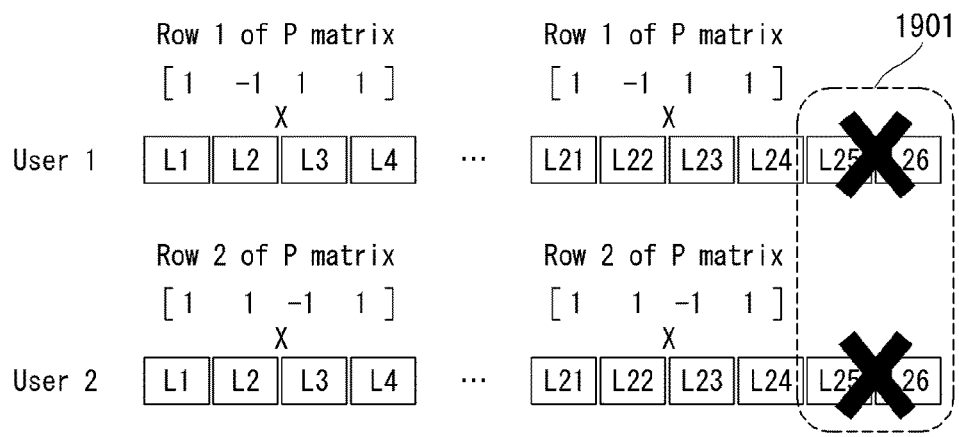
[FIG. 20]
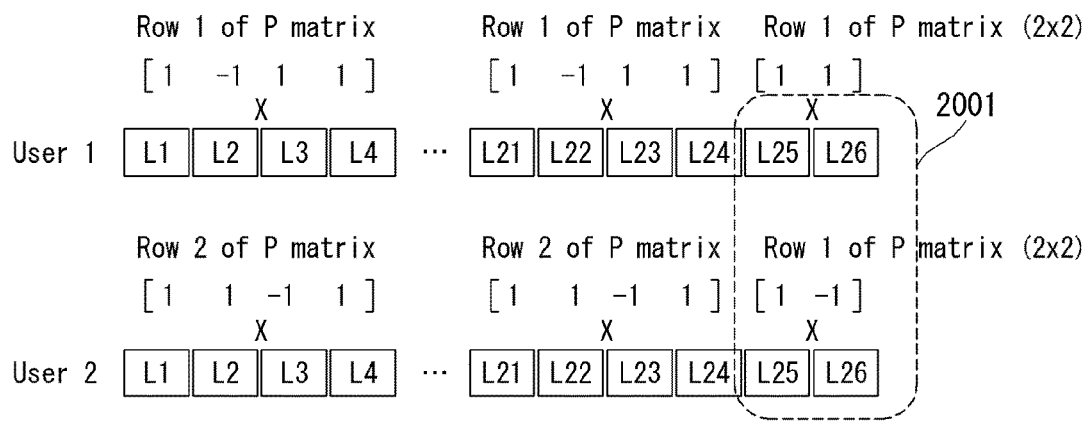

【FIG. 21】
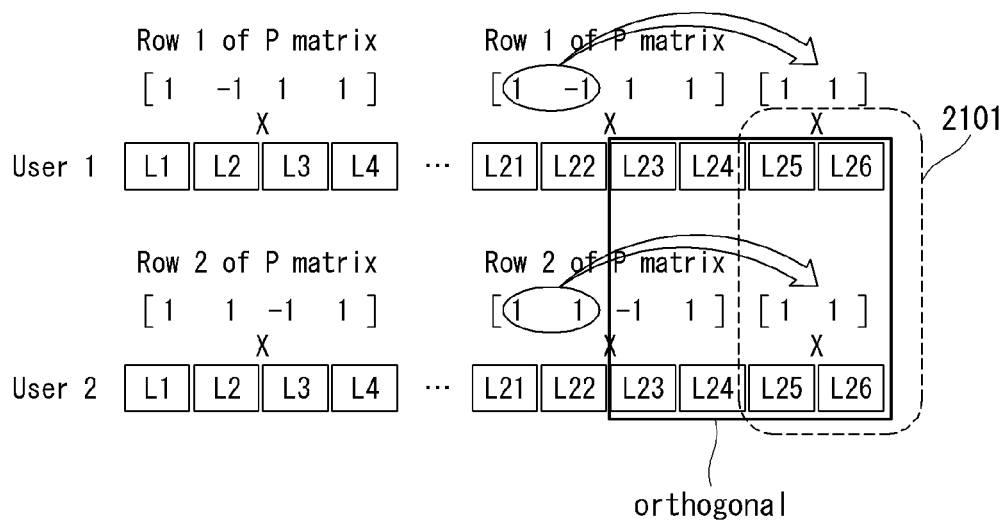
【FIG. 22】
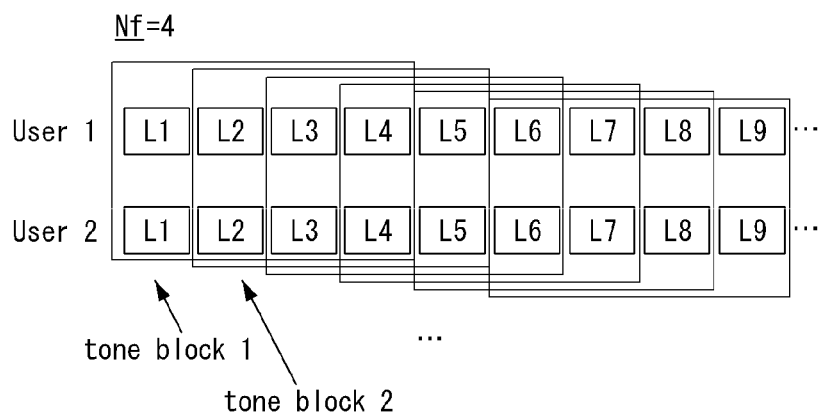

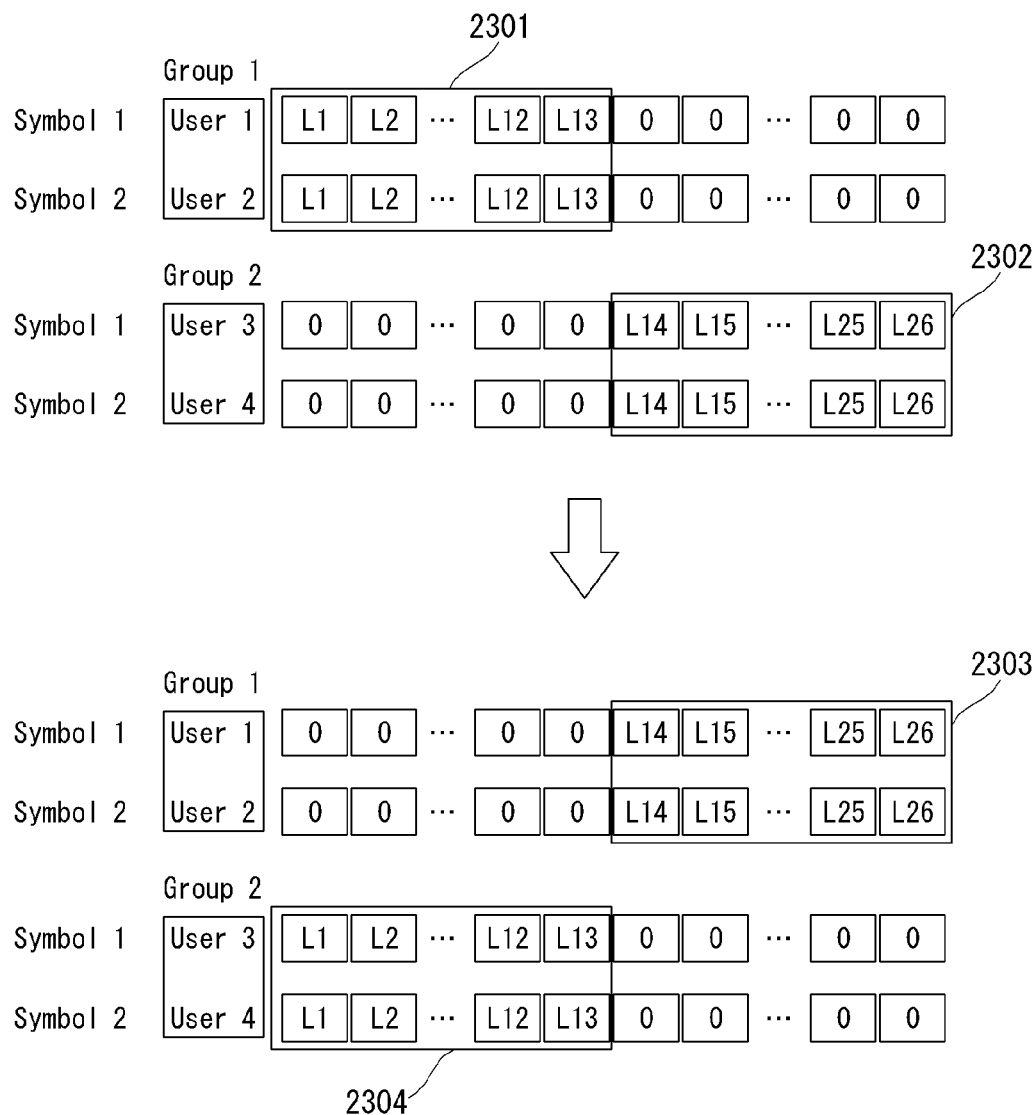

[FIG. 24]
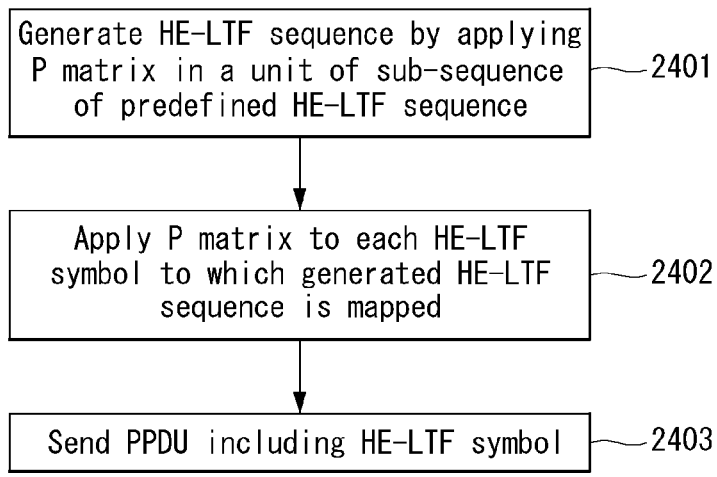
[FIG. 25]
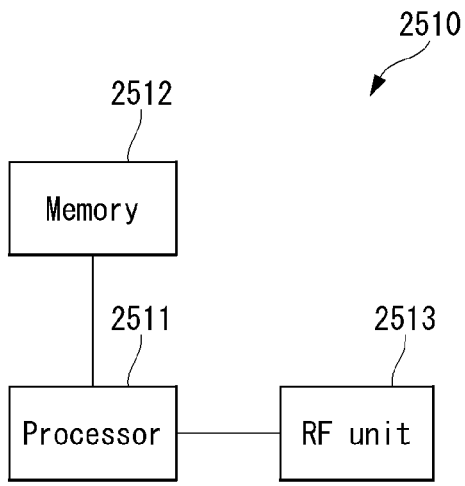
[FIG. 26]
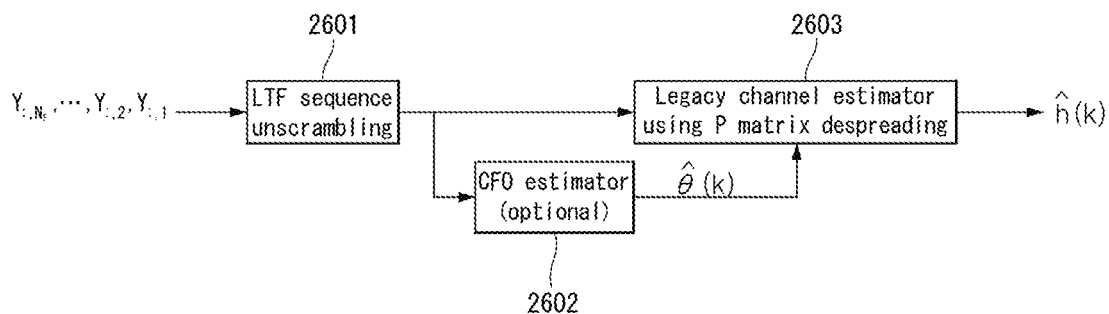

METHOD FOR MULTI-USER TRANSMISSION AND RECEPTION IN WIRELESS COMMUNICATION SYSTEM AND DEVICE FOR SAME

CROSS-REFERENCE TO RELATED APPLICATIONS

This application is the National Stage filing under 35 U.S.C. 371 of International Application No. PCT/KR2015/012940, filed on Nov. 30, 2015, which claims the benefit of U.S. Provisional Application No. 62/111,675, filed on Feb. 4, 2015, 62/143,798, filed on Apr. 6, 2015 and 62/147,563, filed on Apr. 14, 2015, the contents of which are all hereby incorporated by reference herein in their entirety.

TECHNICAL FIELD

The present invention relates to a wireless communication system and, more particularly, to a method for uplink or downlink multi-user transmission and reception and an apparatus for supporting the same.

BACKGROUND ART

Wi-Fi is a wireless local area network (WLAN) technology which enables a device to access the Internet in a frequency band of 2.4 GHz, 5 GHz or 60 GHz.

A WLAN is based on the institute of electrical and electronic engineers (IEEE) 802.11 standard. The wireless next generation standing committee (WNG SC) of IEEE 802.11 is an ad-hoc committee which is worried about the next-generation wireless local area network (WLAN) in the medium to longer term.

IEEE 802.11n has an object of increasing the speed and reliability of a network and extending the coverage of a wireless network. More specifically, IEEE 802.11n supports a high throughput (HT) providing a maximum data rate of 600 Mbps. Furthermore, in order to minimize a transfer error and to optimize a data rate, IEEE 802.11n is based on a multiple inputs and multiple outputs (MIMO) technology in which multiple antennas are used at both ends of a transmission unit and a reception unit.

As the spread of a WLAN is activated and applications using the WLAN are diversified, in the next-generation WLAN system supporting a very high throughput (VHT), IEEE 802.11ac has been newly enacted as the next version of an IEEE 802.11n WLAN system. IEEE 802.11ac supports a data rate of 1 Gbps or more through 80 MHz bandwidth transmission and/or higher bandwidth transmission (e.g., 160 MHz), and chiefly operates in a 5 GHz band.

Recently, a need for a new WLAN system for supporting a higher throughput than a data rate supported by IEEE 802.11ac comes to the fore.

The scope of IEEE 802.11ax chiefly discussed in the next-generation WLAN task group called a so-called IEEE 802.11ax or high efficiency (HEW) WLAN includes 1) the improvement of an 802.11 physical (PHY) layer and medium access control (MAC) layer in bands of 2.4 GHz, 5 GHz, etc., 2) the improvement of spectrum efficiency and area throughput, 3) the improvement of performance in actual indoor and outdoor environments, such as an environment in which an interference source is present, a dense heterogeneous network environment, and an environment in which a high user load is present and so on.

A scenario chiefly taken into consideration in IEEE 802.11ax is a dense environment in which many access points (APs) and many stations (STAs) are present. In IEEE 802.11ax, the improvement of spectrum efficiency and area throughput is discussed in such a situation. More specifically, there is an interest in the improvement of substantial performance in outdoor environments not greatly taken into consideration in existing WLANs in addition to indoor environments.

In IEEE 802.11ax, there is a great interest in scenarios, such as wireless offices, smart homes, stadiums, hotspots, and buildings/apartments. The improvement of system performance in a dense environment in which many APs and many STAs are present is discussed based on the corresponding scenarios.

In the future, it is expected in IEEE 802.11ax that the improvement of system performance in an overlapping basic service set (OBSS) environment, the improvement of an outdoor environment, cellular offloading, and so on rather than single link performance improvement in a single basic service set (BSS) will be actively discussed. The directivity of such IEEE 802.11ax means that the next-generation WLAN will have a technical scope gradually similar to that of mobile communication. Recently, when considering a situation in which mobile communication and a WLAN technology are discussed together in small cells and direct-to-direct (D2D) communication coverage, it is expected that the technological and business convergence of the next-generation WLAN based on IEEE 802.11ax and mobile communication will be further activated.

DISCLOSURE

Technical Problem

In a next-generation WLAN system, the support of uplink multi-user multiple input multiple output (MIMO) transmission is taken into consideration. In this case, there is a limit to measuring a different carrier frequency offset (CFO) for each user by applying both channel estimation and an existing pilot method in a long training field (LTF).

Accordingly, an embodiment of the present invention is to propose a method for configuring a high efficiency (HE)-LTF for multi-user transmission.

Another embodiment of the present invention is to propose a method for measuring a CFO in addition to channel estimation in multi-user transmission.

The objects of the present invention are not limited to the technical objects described above, and other technical objects not mentioned herein may be understood to those skilled in the art from the description below.

Technical Solution

In accordance with an aspect of the present invention, a method for performing, by a station (STA) apparatus, multi-user (MU) transmission in a wireless communication system includes generating a high efficiency-long training field (HE-LTF) sequence in a frequency domain according to an MU transmission bandwidth and sending a physical protocol data unit (PPDU) comprising one or more symbols to which the HE-LTF sequence is mapped. The HE-LTF sequence may be generated by multiplying a predefined sequence by one row of a P matrix in a unit of length of one row of the P matrix.

In accordance with another aspect of the present invention, a station (STA) apparatus performing multi-user (MU) transmission in a wireless communication system includes a radio frequency (RF) unit configured to send or receive a radio signal and a processor configured to control the RF unit. The processor may be configured to generate a high efficiency-long training field (HE-LTF) sequence in a frequency domain according to an MU transmission bandwidth and to send a physical protocol data unit (PPDU) including one or more symbols to which the HE-LTF sequence is mapped. The HE-LTF sequence may be generated by multiplying a predefined sequence by one row of a P matrix in a unit of length of one row of the P matrix.

In accordance with yet another aspect of the present invention, a method for receiving, by a station (STA) apparatus, multi-user (MU) transmission in a wireless communication system includes unscrambling a high efficiency-long training field (HE-LTF) sequence and one row of a P matrix applied to the HE-LTF sequence from a received signal, estimating a carrier frequency offset (CFO) based on a phase difference between symbols in which the signal has been transmitted, and estimating a channel for each of the symbols in which the signal has been transmitted using a value of the estimated CFO. The CFO may be estimated assuming that subcarriers corresponding to the length of the one row of the P matrix have the same channel.

In accordance with yet another aspect of the present invention, an apparatus for receiving multi-user (MU) transmission in a wireless communication system includes a radio frequency (RF) unit configured to send or receive a radio signal and a processor configured to control the RF unit. The processor may be configured to unscramble a high efficiency-long training field (HE-LTF) sequence and one row of a P matrix applied to the HE-LTF sequence from a received signal, estimate a carrier frequency offset (CFO) based on a phase difference between symbols in which the signal has been transmitted, and estimate a channel for each of the symbols in which the signal has been transmitted using a value of the estimated CFO. The CFO may be estimated assuming that subcarriers corresponding to the length of the one row of the P matrix have the same channel.

If a remaining sequence obtained by dividing the predefined sequence by the length of one row of the P matrix is present, the matrix elements of one row of the P matrix may be cyclically shifted and the remaining sequence may be multiplied by the matrix element.

The method may further include applying the one row of the P matrix to the one or more HE-LTF symbols.

The length of the P matrix may be fixed to 8 regardless of the number of time-spatial streams allocated for the MU transmission.

The length of the P matrix may have a combination of one or more of 2, 4 and 8.

The method may be used for a carrier frequency offset and channel estimation in a unit of tones multiplied by the one row of the P matrix.

The method may be used for a carrier frequency offset and channel estimation in a unit of tones having specific tone intervals regardless in a unit of tones multiplied by the one row of the P matrix.

If a remaining sequence obtained by dividing the predefined sequence by the length of one row of the P matrix is present, the remaining sequence may not be multiplied by the one row of the P matrix.

If a remaining sequence obtained by dividing the predefined sequence by the length of one row of the P matrix is present, the remaining sequence may be multiplied by one row of the P matrix suitable for the length of the remaining sequence.

Tones for the mapping of the HE-LTF sequence may be classified and allocated for each group within the MU transmission bandwidth.

The tones for the mapping of the HE-LTF sequence may be differently allocated after a number of symbols corresponding to the number of STAs within the group among the HE-LTF symbols.

Advantageous Effects

In accordance with an embodiment of the present invention, uplink/downlink multi-user transmission can be smoothly performed in a wireless communication system.

Furthermore, according to an embodiment of the present invention, even a CFO in addition to channel estimation can be measured based on an HE-LTF in a wireless communication system.

The technical effects of the present invention are not limited to the technical effects described above, and other technical effects not mentioned herein may be understood to those skilled in the art from the description below.

DESCRIPTION OF DRAWINGS

The accompanying drawings, which are included herein as a part of the description for helping understanding the present invention, provide embodiments of the present invention and describe the technical features of the present invention with the description below.

FIG. 1 is a diagram illustrating an example of IEEE 802.11 system to which the present invention may be applied.

FIG. 2 is a diagram exemplifying a structure of layer architecture in IEEE 802.11 system to which the present invention may be applied.

FIG. 3 exemplifies a non-HT format PPDU and an HT format PPDU of a wireless communication system to which the present invention may be applied.

FIG. 4 exemplifies a VHT format PPDU of a wireless communication system to which the present invention may be applied.

FIG. 5 is a diagram exemplifying a constellation for distinguishing a format of PPDU in a wireless communication system to which the present invention may be applied.

FIG. 6 exemplifies a MAC frame format in IEEE 802.11 system to which the present invention may be applied.

FIG. 7 illustrates the HT format of an HT Control field in a wireless communication system to which an embodiment of the present invention may be applied.

FIG. 8 illustrates the VHT format of an HT Control field in a wireless communication system to which an embodiment of the present invention may be applied.

FIG. 9 is a diagram for illustrating a known link setup procedure in a wireless communication system to which an embodiment of the present invention may be applied.

FIG. 10 is a diagram for illustrating a random backoff period and a frame transmission procedure in a wireless communication system to which an embodiment of the present invention may be applied.

FIG. 11 is a diagram illustrating a VHT-LTF in a wireless communication system to which an embodiment of the present invention may be applied.

FIGS. 12 to 15 are diagrams illustrating a high efficiency (HE) format PPDU according to an embodiment of the present invention.

FIG. 16 illustrates a method for generating an HE-LTF sequence according to an embodiment of the present invention.

FIG. 17 illustrates a method for configuring an HE-LTF field according to an embodiment of the present invention.

FIG. 18 is a diagram illustrating a CFO estimation method according to an embodiment of the present invention.

FIGS. 19 to 21 are diagrams illustrating a method for generating an HE-LTF sequence according to an embodiment of the present invention.

FIG. 22 is a diagram illustrating a method for estimating a CFO and channel according to an embodiment of the present invention.

FIG. 23 is a diagram illustrating a method for generating an HE-LTF sequence according to an embodiment of the present invention.

FIG. 24 is a diagram illustrating a method for uplink multi-user transmission according to an embodiment of the present invention.

FIG. 25 is a block diagram illustrating a wireless apparatus according to an embodiment of the present invention.

FIG. 26 is a detailed diagram illustrating the processor of FIG. 25 according to an embodiment of the present invention.

MODE FOR INVENTION

Hereinafter, a preferred embodiment of the present invention will be described by reference to the accompanying drawings. The description that will be described below with the accompanying drawings is to describe exemplary embodiments of the present invention, and is not intended to describe the only embodiment in which the present invention may be implemented. The description below includes particular details in order to provide perfect understanding of the present invention. However, it is understood that the present invention may be embodied without the particular details to those skilled in the art.

In some cases, in order to prevent the technical concept of the present invention from being unclear, structures or devices which are publicly known may be omitted, or may be depicted as a block diagram centering on the core functions of the structures or the devices.

Specific terminologies used in the description below may be provided to help the understanding of the present invention. And, the specific terminology may be modified into other forms within the scope of the technical concept of the present invention.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for Mobile communications (GSM)/general packet radio service (GPRS)/enhanced data rates for GSM evolution (EDGE). OFDMA may be implemented using a radio technology, such as institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, IEEE 802.11 is chiefly described, but the technical characteristics of the present invention are not limited thereto.

General System

FIG. 1 is a diagram showing an example of an IEEE 802.11 system to which an embodiment of the present invention may be applied.

The IEEE 802.11 configuration may include a plurality of elements. There may be provided a wireless communication system supporting transparent station (STA) mobility for a higher layer through an interaction between the elements. A basic service set (BSS) may correspond to a basic configuration block in an IEEE 802.11 system.

FIG. 1 illustrates that three BSSs BSS 1 to BSS 3 are present and two STAs (e.g., an STA 1 and an STA 2 are included in the BSS 1, an STA 3 and an STA 4 are included in the BSS 2, and an STA 5 and an STA 6 are included in the BSS 3) are included as the members of each BSS.

In FIG. 1, an ellipse indicative of a BSS may be interpreted as being indicative of a coverage area in which STAs included in the corresponding BSS maintain communication. Such an area may be called a basic service area (BSA). When an STA moves outside the BSA, it is unable to directly communicate with other STAs within the corresponding BSA.

In the IEEE 802.11 system, the most basic type of a BSS is an independent a BSS (IBSS). For example, an IBSS may have a minimum form including only two STAs. Furthermore, the BSS 3 of FIG. 1 which is the simplest form and from which other elements have been omitted may correspond to a representative example of the IBSS. Such a configuration may be possible if STAs can directly communicate with each other. Furthermore, a LAN of such a form is not previously planned and configured, but may be configured when it is necessary. This may also be called an ad-hoc network.

When an STA is powered off or on or an STA enters into or exits from a BSS area, the membership of the STA in the BSS may be dynamically changed. In order to become a member of a BSS, an STA may join the BSS using a synchronization process. In order to access all of services in a BSS-based configuration, an STA needs to be associated with the BSS. Such association may be dynamically configured, and may include the use of a distribution system service (DSS).

In an 802.11 system, the distance of a direct STA-to-STA may be constrained by physical layer (PHY) performance. In any case, the limit of such a distance may be sufficient, but communication between STAs in a longer distance may be required, if necessary. In order to support extended coverage, a distribution system (DS) may be configured.

The DS means a configuration in which BSSs are interconnected. More specifically, a BSS may be present as an element of an extended form of a network including a plurality of BSSs instead of an independent BSS as in FIG. 1.

The DS is a logical concept and may be specified by the characteristics of a distribution system medium (DSM). In the IEEE 802.11 standard, a wireless medium (WM) and a distribution system medium (DSM) are logically divided. Each logical medium is used for a different purpose and used by a different element. In the definition of the IEEE 802.11 standard, such media are not limited to the same one and are also not limited to different ones. The flexibility of the configuration (i.e., a DS configuration or another network configuration) of an IEEE 802.11 system may be described in that a plurality of media is logically different as described above. That is, an IEEE 802.11 system configuration may be implemented in various ways, and a corresponding system configuration may be independently specified by the physical characteristics of each implementation example.

The DS can support a mobile device by providing the seamless integration of a plurality of BSSs and providing logical services required to handle an address to a destination.

An AP means an entity which enables access to a DS through a WM with respect to associated STAs and has the STA functionality. The movement of data between a BSS and the DS can be performed through an AP. For example, each of the STA 2 and the STA 3 of FIG. 1 has the functionality of an STA and provides a function which enables associated STAs (e.g., the STA 1 and the STA 4) to access the DS. Furthermore, all of APs basically correspond to an STA, and thus all of the APs are entities capable of being addressed. An address used by an AP for communication on a WM and an address used by an AP for communication on a DSM may not need to be necessarily the same.

Data transmitted from one of STAs, associated with an AP, to the STA address of the AP may be always received by an uncontrolled port and processed by an IEEE 802.1X port access entity. Furthermore, when a controlled port is authenticated, transmission data (or frame) may be delivered to a DS.

A wireless network having an arbitrary size and complexity may include a DS and BSSs. In an IEEE 802.11 system, a network of such a method is called an extended service set (ESS) network. The ESS may correspond to a set of BSSs connected to a single DS. However, the ESS does not include a DS. The ESS network is characterized in that it looks like an IBSS network in a logical link control (LLC) layer. STAs included in the ESS may communicate with each other. Mobile STAs may move from one BSS to the other BSS (within the same ESS) in a manner transparent to the LLC layer.

In an IEEE 802.11 system, the relative physical positions of BSSs in FIG. 1 are not assumed, and the following forms are all possible.

More specifically, BSSs may partially overlap, which is a form commonly used to provide consecutive coverage. Furthermore, BSSs may not be physically connected, and logically there is no limit to the distance between BSSs. Furthermore, BSSs may be placed in the same position physically and may be used to provide redundancy. Furthermore, one (or one or more) IBSS or ESS networks may be physically present in the same space as one or more ESS networks. This may correspond to an ESS network form if an ad-hoc network operates at the position in which an ESS network is present, if IEEE 802.11 networks that physically overlap are configured by different organizations, or if two or more different access and security policies are required at the same position.

In a WLAN system, an STA is an apparatus operating in accordance with the medium access control (MAC)/PHY regulations of IEEE 802.11. An STA may include an AP STA and a non-AP STA unless the functionality of the STA is not individually different from that of an AP. In this case, assuming that communication is performed between an STA and an AP, the STA may be interpreted as being a non-AP STA. In the example of FIG. 1, the STA 1, the STA 4, the STA 5, and the STA 6 correspond to non-AP STAs, and the STA 2 and the STA 3 correspond to AP STAs.

A non-AP STA corresponds to an apparatus directly handled by a user, such as a laptop computer or a mobile phone. In the following description, a non-AP STA may also be called a wireless device, a terminal, user equipment (UE), a mobile station (MS), a mobile terminal, a wireless terminal, a wireless transmit/receive unit (WTRU), a network interface device, a machine-type communication (MTC) device, a machine-to-machine (M2M) device or the like.

Furthermore, an AP is a concept corresponding to a base station (BS), a node-B, an evolved Node-B (eNB), a base transceiver system (BTS), a femto BS or the like in other wireless communication fields.

Hereinafter, in this specification, downlink (DL) means communication from an AP to a non-AP STA. Uplink (UL) means communication from a non-AP STA to an AP. In DL, a transmitter may be part of an AP, and a receiver may be part of a non-AP STA. In UL, a transmitter may be part of a non-AP STA, and a receiver may be part of an AP.

FIG. 2 is a diagram illustrating the structure of layer architecture of an IEEE 802.11 system to which an embodiment of the present invention may be applied.

Referring to FIG. 2, the layer architecture of the IEEE 802.11 system may include a medium access control (MAC) sublayer/layer and a physical (PHY) sublayer/layer.

The PHY may be divided into a physical layer convergence procedure (PLCP) entity and a physical medium dependent (PMD) entity. In this case, the PLCP entity may function to connect the MAC and a data frame, and the PMD entity may function to wirelessly send or receive two or more STAs and data.

Both the MAC and the PHY may include management entities, which may be respectively called a MAC sublayer management entity (MLME) and a physical sublayer management entity (PLME). The management entities provide a layer management service interface through the operation of a layer management function. The MLME is connected to the PLME and may perform the management operation of the MAC. Likewise, the PLME is connected to the MLME and may perform the management operation of the PHY.

In order to provide an accurate MAC operation, a station management entity (SME) may be present in each STA. The SME is an management entity independent of each layer, and collects layer-based status information from the MLME and the PLME or sets the value of specific parameters of each layer. The SME may perform such a function instead of common system management entities and may implement a standard management protocol.

The MLME, PLME and SME may interface with each other using various primitive-based methods. More specifically, an XX-GET.request primitive is used to request the value of an management information base (MIB) attribute. An XX-GET.confirm primitive returns a corresponding MIB attribute value if the status is "SUCCESS." In other cases, the XX-GET.confirm primitive indicates an error in its state field and returns the error. An XX-SET.request primitive is used to request that a designate MIB attribute is set as a given value. If the MIB attribute means a specific operation, the request of the XX-SET.request primitive means the execution of the specific operation. Furthermore, if the state of an XX-SET.confirm primitive is "SUCCESS", this means that a designated MIB attribute has been set as a requested value. In other cases, the state field of the XX-SET.confirm primitive indicates an error situation. If the MIB attribute means a specific operation, the XX-SET.confirm primitive may confirm that the corresponding operation has been executed.

The PHY provides an interface with the MAC through TXVECTOR, RXVECTOR and PHYCONFIG_VECTOR. TXVECTOR supports a transmission parameter for each PPDU with respect to the PHY. The PHY notifies the MAC of a received PPDU parameter using RXVECTOR. TXVECTOR is transferred from the MAC to the PHY through a PHY-TXSTART.request primitive. RXVECTOR is transferred from the PHY to the MAC through a PHY-RXSTART.indication primitive.

The MAC configures the operation of the PHY regardless of frame transmission or reception using PHYCONFIG_VECTOR.

An operation in each sublayer (or layer) is described in brief below.

The MAC generates one or more MAC protocol data units (MPDUs) by attaching a MAC header and a frame check sequence (FCS) to a MAC service data unit (MSDU) received from a higher layer (e.g., LLC) or a fragment of the MSDU. The generated MPDU is transferred to the PHY.

If an aggregated MSDU (A-MSDU) scheme is used, a plurality of MSDUs may be aggregated into a single aggregated MSDU (A-MSDU). An MSDU aggregation operation may be performed in the MAC higher layer. The A-MSDU is transferred to the PHY as a single MPDU (if it has not been fragmented).

The PHY generates a physical protocol data unit (PPDU) by attaching an additional field, including information necessary for a physical layer transceiver, to a physical service data unit (PSDU) received from the MAC. The PPDU is transmitted through a radio medium.

The PSDU has been received by the PHY from the MAC and the MPDU has been transmitted from the MAC to the PHY. Accordingly, the PSDU is substantially the same as the MPDU.

If the A-MPDU scheme is used, a plurality of MPDUs (in this case, each MPDU may carry an A-MSDU) may be aggregated into a single A-MPDU. An MPDU aggregation operation may be performed in the MAC lower layer. A variety of types of MPDUs (e.g., QoS data, acknowledge (ACK) and block ACK) may be aggregated into the A-MPDU. The PHY receives an A-MPDU from the MAC as a single PSDU. That is, the PSDU includes a plurality of MPDUs. Accordingly, the A-MPDU is transmitted within a single PPDU through a radio medium.

Physical Protocol Data Unit (PPDU) Format

A Physical Protocol Data Unit (PPDU) signifies a data block which is generated in physical layer. Hereinafter, the PPDU format will be described based on IEEE 802.11 WLAN system to which the present invention may be applied.

FIG. 3 exemplifies a non-HT format PPDU and an HT format PPDU of a wireless communication system to which the present invention may be applied.

FIG. 3(a) exemplifies the non-HT format for supporting IEEE 802.11a/g system. The non-HT PPDU may also be called a legacy PPDU.

Referring to FIG. 3(a), the non-HT format PPDU includes a legacy format preamble that includes a Legacy (or Non-HT) Short Training field (L-STF), a Legacy (or Non-HT) Long Training field (L-LTF) and a Legacy (or Non-HT) SIGNAL (L-SIG) field, and a data field.

The L-STF may include a short training orthogonal frequency division multiplexing (OFDM) symbol. The L-STF may be used for frame timing acquisition, Automatic Gain Control (AGC), diversity detection and coarse frequency/time synchronization.

The L-LTF may include a long training orthogonal frequency division multiplexing (OFDM) symbol. The L-LTF may be used for fine frequency/time synchronization and channel estimation.

The L-SIG field may be used for transmitting control information for demodulating and decoding a data field. The L-SIG field may include information on a data rate and a data length.

FIG. 3(b) exemplifies an HT-mixed format PPDU for supporting both IEEE 802.11n system and IEEE 802.11a/g system.

Referring to FIG. 3(b), the HT-mixed format PPDU includes an HT format preamble that includes a legacy format preamble including the L-STF, the L-LTF and the L-SIG field, an HT-Signal (HT-SIG) field, an HT Short Training field (HT-STF) and an HT Long Training field (HT-LTF), and a data field.

Since the L-STF, the L-LTF and the L-SIG field signify legacy fields for backward compatibility, the fields from the L-STF to the L-SIG field are identical to those of the non-HT format. The L-STA may interpret a data field through the L-STF, the L-LTF and the L-SIG field even though the L-STA receives a HT-mixed PPDU. However, the L-LTF may further include information for channel estimation such that an HT-STA receives the HT-mixed PPDU and demodulates the L-SIG field and the HT-SIG field.

The HT-STA may notice that the field behind the legacy field is the HT-mixed format PPDU using the HT-SIG field, and based on this, the HT-STA may decode the data field.

The HT-LTF field may be used for channel estimation for demodulating the data field. Since IEEE 802.11n standard supports Single-User Multi-Input and Multi-Output (SU-MIMO), a plurality of the HT-LTF fields may be included for the channel estimation with respect to each data field transmitted via a plurality of spatial streams.

The HT-LTF field may include a data HT-LTF used for channel estimation with respect to spatial stream and an extension HT-LTF additionally used for full channel sounding. Accordingly, the number of a plurality of HT-LTF may be equal to or more than the number of transmitted spatial stream.

In the HT-mixed format PPDU, the L-STF, the L-LTF and the L-SIG field are firstly transmitted such that an L-STA also receives and acquires data. Later, the HT-SIG field is transmitted for demodulating and decoding the data transmitted for the HT-STA.

Up to the HT-SIG field, fields are transmitted without performing beamforming such that the L-STA and the HT-STA receive the corresponding PPDU and acquire data, and wireless signal transmission is performed through precoding for the HT-STF, the HT-LTF and the data field, which are transmitted later. Herein, the plurality of HT-LTF and the data field are transmitted after transmitting the HT-STF such that the STA that receives data through precoding may consider the part in which power is varied by precoding.

FIG. 3(c) exemplifies an HT-greenfield (HT-GF) format PPDU for supporting IEEE 802.11n system only.

Referring to FIG. 3(c), the HT-GF format PPDU includes an HT-GF-STF, an HT-LTF1, an HT-SIG field, a plurality of HT-LTF2 and a data field.

The HT-GF-STF is used for frame time acquisition and AGC.

The HT-LTF1 is used for channel estimation.

The HT-SIG field is used for demodulating and decoding the data field.

The HT-LTF2 is used for channel estimation for demodulating the data field. Similarly, since the HT-STA requires channel estimation for each data field transmitted via a plurality of spatial streams due to the use of SU-MIMO, a plurality of HT-LTF2 may be included.

The plurality of HT-LTF2 may include a plurality of DATA HT-LTF and a plurality of extension HT-LTF, similar to the HT-LTF field of the HT-mixed PPDU.

In 3(a) to 3(c), the data field is payload, and may include a service field, a scrambled PSDU field, tail bits, and padding bits. All of the bits of the data field are scrambled.

FIG. 3(d) shows a service field included in the data field. The service field has 16 bits. The 16 bits are respectively assigned No. 0 to No. 15 and are sequentially from the No. 0 bit. No. 0 to No. 6 are set to 0 and used to synchronize descramblers within a reception end.

In order to effectively utilize radio channels, IEEE 802.11ac WLAN system supports a transmission of downlink Multi User Multiple Input Multiple Output (MU-MIMO) scheme in which a plurality of STAs access channel simultaneously. According to the MU-MIMO transmission scheme, an AP may transmit packets to one or more STAs that are paired by MIMO simultaneously.

A downlink multi-user (DL MU) transmission means a technique that an AP transmits a PPDU to a plurality of non-AP STAs through the same time resource through one or more antennas.

Hereinafter, the MU PPDU means a PPDU that transmits one or more PSDUs for one or more STAs using the MU-MIMO technique or the OFDMA technique. Furthermore, the SU PPDU means a PPDU which is available to deliver only one PSDU or a PPDU that has a format in which the PSDU is not existed.

For the MU-MIMO transmission, the size of the control information transmitted to an STA may be relatively greater than that of the control information based on 802.11n. Examples of the control information additionally required for supporting the MU-MIMO may include information indicating the number of spatial stream received by each STA, the information related to modulating and coding the data transmitted to each STA, and the like.

Accordingly, when the MU-MIMO transmission is performed for providing data service to a plurality of STAs simultaneously, the size of transmitted control information may increase as the number of STAs that receive the control information.

As described above, in order to effectively transmit the increasing size of the control information, a plurality of control information required for the MU-MIMO transmission may be transmitted by being classified into common control information commonly required for all STAs and dedicated control information individually required for a specific STA.

FIG. 4 exemplifies a VHT format PPDU of a wireless communication system to which the present invention may be applied.

Referring to FIG. 4, the VHT format PPDU includes a legacy format preamble that includes the L-STF, the L-LTF and the L-SIG field and a VHT format preamble that includes a VHT-Signal-A (VHT-SIG-A) field, a VHT Short Training field (VHT-STF), a VHT Long Training field (VHT-LTF) and a VHT-Signal-B (VHT-SIG-B) field and a data field.

Since the L-STF, the L-LTF and the L-SIG field signify legacy fields for backward compatibility, the fields from the L-STF to the L-SIG field are identical to those of the non-HT format. However, the L-LTF may further include information for channel estimation to be performed to demodulate the L-SIG field and the VHT-SIG-A field.

The L-STF, the L-LTF, the L-SIG field and the VHT-SIG-A field may be repeatedly transmitted in a unit of 20 MHz channel. For example, when a PPDU is transmitted through four 20 MHz channels (i.e., 80 MHz bandwidth), the L-STF, the L-LTF, the L-SIG field and the VHT-SIG-A field may be repeatedly transmitted in every 20 MHz channel.

The VHT-STA may be aware whether the PPDU is the VHT format PPDU using the VHT-SIG-A field which follows the legacy field, and based on this, the VHT-STA may decode the data field.

In the VHT format PPDU, the L-STF, the L-LTF and the L-SIG field are firstly transmitted such that an L-STA also receives and acquires data. Later, the VHT-SIG-A field is transmitted for demodulating and decoding the data transmitted for the VHT-STA.

The VHT-SIG-A field is a field for transmitting common control information between VHT STAs paired with an AP in MIMO scheme, and includes the control information for interpreting the received VHT format PPDU.

The VHT-SIG-A field may include a VHT-SIG-A1 field and a VHT-SIG-A2 field.

The VHT-SIG-A1 field may include channel bandwidth (BW) information to use, information on whether to apply Space Time Block Coding (STBC), Group Identifier (Group ID) information for indicating a group of STAs that are grouped in MU-MIMO scheme, information of the Number of space-time stream (NSTS) to use/Partial association Identifier (AID) and Transmit power save forbidden information. Herein, the Group ID may signify an identifier allocated to an STA group which is to be transmitted for supporting MU-MIMO transmission, and may represent whether the currently used MIMO transmission scheme is MU-MIMO or SU-MIMO.

Table 1 below exemplifies the VHT-SIG-A1 field.

TABLE 1

| FIELD | BIT | DESCRIPTION |
|---|---|---|
| BW | 2 | In the case of 20 MHz, the BW is set to "0", In the case of 40 MHz, the BW is set to "1", In the case of 80 MHz, the BW is set to "2", In the case of 160 MHz or 80 + 80 MHz, the BW is set to "3." |
| Reserved | 1 | |
| STBC | 1 | In the case of VHT SU PPDU: If STBC is used, the STBC is set to "1", Otherwise, the STBC is set to "0" In the case of VHT MU PPDU: The STBS is set to "0" |

TABLE 1-continued

| FIELD | BIT | DESCRIPTION |
|---|---|---|
| Group ID | 6 | The Group ID indicates the ID of a group<br>"0" or "63" indicates VHT SU PPDU, otherwise indicates VHT MU PPDU |
| NSTS/Partial AID | 12 | In the case of VHT MU PPDU, the NSTS/Partial AID is divided by 4 user position "p" each having 3 bits<br>If a space time stream is 0, the NSTS/Partial AID is set to "0",<br>If a space time stream is 1, the NSTS/Partial AID is set to "1",<br>If a space time stream is 2, the NSTS/Partial AID is set to "2",<br>If a space time stream is 3, the NSTS/Partial AID is set to "3",<br>If a space time stream is 4, the NSTS/Partial AID is set to "4."<br>In the case of VHT SU PPDU,<br>Top 3 bits are set as follows.<br>If a space time stream is 1, the NSTS/Partial AID is set to "0",<br>If a space time stream is 2, the NSTS/Partial AID is set to "1",<br>If a space time stream is 3, the NSTS/Partial AID is set to "2",<br>If a space time stream is 4, the NSTS/Partial AID is set to "3",<br>If a space time stream is 5, the NSTS/Partial AID is set to "4",<br>If a space time stream is 6, the NSTS/Partial AID is set to "5",<br>If a space time stream is 7, the NSTS/Partial AID is set to "6",<br>If a space time stream is 8, the NSTS/Partial AID is set to "7",<br>Bottom 9 bits indicate the Partial AID. |
| TXOP_PS_NOT_ALLOWED | 1 | When a VHT AP allows non-AP VHT STA shifted to a power save mode for transmission opportunity (TXOP), TXOP_PS_NOT_ALLOWED is set to "0."<br>Otherwise, TXOP_PS_NOT_ALLOWED is set to "1."<br>In the case of a VHT PPDU transmitted by a non-AP VHT STA, TXOP_PS_NOT_ALLOWED is set to "1." |
| Reserved | 1 | |

The VHT-SIG-A2 field may include information on whether to use a short Guard Interval (GI), Forward Error Correction (FEC) information, information on Modulation and Coding Scheme (MCS) for a single user, information on types of channel coding for a plurality of users, beamforming related information, redundancy bits for Cyclic Redundancy Checking (CRC), a tail bit of convolutional decoder, and the like.

Table 2 below exemplifies the VHT-SIG-A2 field.

TABLE 2

| FIELD | BIT | DESCRIPTION |
|---|---|---|
| Short GI | 1 | If a short GI is not used in a data field, the Short GI is set to "0",<br>If a short GI is used in a data field, the Short GI is set to "1." |
| Short GI disambiguation | 1 | If a short GI is used and an additional symbol is required for a payload of PPDU, the Short Gi disambiguation is set to "1",<br>If an additional symbol is not required, the Short Gi disambiguation is set to "0." |
| SU/MU Coding | 1 | In the case of a VHT SU PPDU:<br>In the case of BCC(binary convolutional code), SU/MU Coding is set to "0",<br>In the case of LDPC (low-density parity check), SU/MU Coding is set to "1."<br>In the case of a VHT MU PPDU:<br>If the NSTS field of which user position is "0" is not "0", SU/MU Coding indicates coding to use.<br>In the case of BCC, SU/MU Coding is set to "0",<br>In the case of LDPC, SU/MU Coding is set to "1."<br>If the NSTS field of which user position is "0" is "0", SU/MU Coding is set to "1" as a reserved field. |
| LDPC Extra OFDM Symbol | 1 | If an additional extra OFDM symbol is required owing to LDPC PPDU encoding procedure (in the case of an SU PPDU) or PPDU encoding procedure of at least one LDPC user (in the case of VHT MU PPDU), the LDPC Extra OFDM Symbol is set to "1."<br>Otherwise, the LDPC Extra OFDM Symbol is set to "0." |
| SU VHT MCS/ MU Coding | 4 | In the case of a VHT SU PPDU:<br>SU VHT MCS/MU Coding indicates a VHT-MCS index.<br>In the case of a VHT MU PPDU:<br>SU VHT MCS/MU Coding indicates coding for user positions "1" to "3" in ascending orders from the top bit.<br>If the NSTS field of each user is not "1", SU VHT MCS/MU Coding indicates coding to use.<br>In the case of BCC, SU VHT MCS/MU Coding is set to "0",<br>In the case of LDPC, SU VHT MCS/MU Coding is set to "1."<br>If the NSTS field of each user is "0", SU VHT MCS/MU Coding is set to "1" as a reserved field. |

TABLE 2-continued

| FIELD | BIT | DESCRIPTION |
|---|---|---|
| Beamformed | 1 | In the case of a VHT SU PPDU:<br>If a beamforming steering matrix is applied to SU transmission, Beamformed is set to "1."<br>Otherwise, Beamformed is set to "0"<br>In the case of a VHT MU PPDU:<br>Beamformed is set to "1" as a reserved field. |
| Reserved | 1 | |
| CRC | 8 | CRC includes CRC for detecting an error of a PPDU in the receiver |
| Tail | 6 | Tails are used for the trellis end of a convolutional decoder<br>Tails are set to "0." |

The VHT-STF is used for improving the performance of AGC estimation in MIMO transmission. The VHT-STF field duration is 4 μs.

The VHT-LTF is used for a VHT-STA to estimate a MIMO channel.

Since a VHT WLAN system support the MU-MIMO, the VHT-LTF may be setup as much as the number of spatial streams through which a PPDU is transmitted. Additionally, in the case that full channel sounding is supported, the number of VHT-LTFs may increase.

The VHT-SIG-B field includes dedicated control information required to acquire data for a plurality of VHT-STAs paired in MU-MIMO scheme by receiving a PPDU. Accordingly, only in the case that the common control information included in the VHT-SIG-A field indicates a MU-MIMO transmission by a PPDU which is currently received, a VHT-STA may be designed to decode the VHT-SIG-B field. On the contrary, in the case that the common control information indicates that a PPDU currently received is for a single VHT-STA (including SU-MIMO), an STA may be designed not to decode the VHT-SIG-B field.

The VHT-SIG-B field includes information on modulation, encoding and rate-matching of each of the VHT-STAs. A size of the VHT-SIG-B field may be different depending on types of MIMO transmission (MU-MIMO or SU-MIMO) and channel bandwidths which are used for PPDU transmissions.

In order to transmit PPDUs of the same size to STAs paired with an AP in a system that supports the MU-MIMO, information indicating a bit size of a data field that configures the PPDU and/or information indicating a bit stream size that configures a specific field may be included in the VHT-SIG-A field.

However, in order to efficiently use the PPDU format, the L-SIG field may be used. In order for the PPDUs of the same size to be transmitted to all STAs, a length field and a rate field transmitted with being included in the L-SIG field may be used for providing required information. In this case, since a MAC Protocol Data Unit (MPDU) and/or an Aggregate MAC Protocol Data Unit (A-MPDU) are configured based on bytes (or octet (oct)) of the MAC layer, an additional padding may be required in the physical layer.

The data field in FIG. 4 is a payload, and may include a SERVICE field, a scrambled PSDU, tail bits and padding bits.

As described above, since several formats of PPDU are used in a mixed manner, an STA should be able to distinguish a format of received PPDU.

Herein, the meaning of distinguishing PPDU (or classifying the format of PPDU) may have various meanings. For example, the meaning of distinguishing PPDU may have a meaning of determining whether the received PPDU is a PPDU that is available to be decoded (or interpreted) by an STA. In addition, the meaning of distinguishing PPDU may have a meaning of determining whether the received PPDU is a PPDU that is available to be supported by an STA. Furthermore, the meaning of distinguishing PPDU may be interpreted as a meaning of classifying what the information is that is transmitted through the received PPDU.

This will be described in more detail by reference to the drawing below.

FIG. 5 is a diagram exemplifying a constellation for distinguishing a format of PPDU in a wireless communication system to which the present invention may be applied.

FIG. 5(a) exemplifies a constellation of an L-SIG field included in a non-HT format PPDU and FIG. 5(b) exemplifies a phase rotation for detecting an HT-mixed format PPDU. And FIG. 5(c) exemplifies a phase rotation for detecting a VHT format PPDU.

In order for an STA to distinguish the non-HT format PPDU, the HT-GF format PPDU, the HT-mixed format PPDU and the VHT format PPDU, a phase of constellation of the L-SIG field and the OFDM symbol transmitted after the L-SIG field are used. That is, the STA may classify a PPDU format based on the phase of constellation of the L-SIG field and the OFDM symbol transmitted after the L-SIG field.

Referring to FIG. 5(a), the OFDM symbol that configures the L-SIG field utilizes Binary Phase Shift Keying (BPSK).

First, in order to distinguish the HT-GF format PPDU, when an initial SIG field is detected in a received PPDU, an STA determines whether the SIG field is the L-SIG field. That is, the STA tries to decode based on the constellation example shown in FIG. 5(a). When the STA fail to decode, it may be determined that the corresponding PPDU is the HT-GF format PPDU.

Next, in order to classify the non-HT format PPDU, the HT-mixed format PPDU and the VHT format PPDU, the phase of constellation of the OFDM symbol transmitted after the L-SIG field may be used. That is, the modulation method of the OFDM symbol transmitted after the L-SIG field may be different, and the STA may classify the PPDU formats based on the modulation method for the field after the L-SIG field of the received PPDU.

Referring to FIG. 5(b), in order to distinguish the HT-mixed format PPDU, the phase of two OFDM symbols transmitted after the L-SIG field in the HT-mixed format PPDU may be used.

More particularly, the phases of both OFDM symbol #1 and OFDM symbol #2 that correspond to the HT-SIG field transmitted after the L-SIG field in the HT-mixed format PPDU rotate as much as 90 degrees in counter-clock wise direction. That is, the modulation method for OFDM symbol #1 and OFDM symbol #2 uses Quadrature Binary Phase Shift Keying (QBPSK). The QBPSK constellation may be a constellation of which phase rotates as much as 90 degrees in counter-clock wise direction with respect to the BPSK constellation.

An STA tries to decode OFDM symbol #1 and OFDM symbol #2 that correspond to the HT-SIG field transmitted after the L-SIG field of the received PPDU based on the constellation example shown in FIG. 5(b). When the STA is successful in decoding, the STA determines the corresponding PPDU to be the HT format PPDU.

Next, in order to distinguish the non-HT format PPDU and the VHT format PPDU, the phase of constellation of the OFDM symbol transmitted after the L-SIG field may be used.

Referring to FIG. 5(c), in order to distinguish the VHT format PPDU, the phases of two OFDM symbols transmitted after the L-SIG field in the VHT format PPDU may be used.

More particularly, the phase of OFDM symbol #1 that corresponds to the VHT-SIG-A field after the L-SIG field in the VHT format PPDU does not rotate, but the phase of OFDM symbol #2 rotates as much as 90 degrees in counter-clock wise direction. That is, the modulation method for OFDM symbol #1 uses the BPSK and the modulation method for OFDM symbol #2 uses the QBPSK.

An STA tries to decode OFDM symbol #1 and OFDM symbol #2 that correspond to the VHT-SIG field transmitted after the L-SIG field of the received PPDU based on the constellation example shown in FIG. 5(c). When the STA is successful in decoding, the STA may determine the corresponding PPDU to be the VHT format PPDU.

Meanwhile, when the STA fails to decode, the STA may determine the corresponding PPDU to be the non-HT format PPDU.

MAC Frame Format

FIG. 6 exemplifies a MAC frame format in IEEE 802.11 system to which the present invention may be applied.

Referring to FIG. 6, a MAC frame (i.e., MPDU) includes a MAC Header, a Frame Body and a frame check sequence (FCS).

The MAC Header is defined by regions that include Frame Control field, Duration/ID field, Address 1 field, Address 2 field, Address 3 field, Sequence Control field, Address 4 field, QoS Control field and HT Control field.

The Frame Control field includes information on characteristics of the corresponding MAC frame. Detailed description for the Frame Control field will be described below.

The Duration/ID field may be implemented to have different values according to a type and a subtype of the corresponding MAC frame.

In the case that a type and a subtype of the corresponding MAC frame is a PS-Poll frame for the power save (PS) operation, the Duration/ID field may be configured to include an association identifier of the STA that transmits the frame. In other case, the Duration/ID field may be configured to have a specific duration value depending on the corresponding type and subtype of the MAC frame. In addition, in the case that the frame is an MPDU included in the aggregate-MPDU (A-MPDU) format, all of the Duration/ID fields included in the MAC header may be configured to have the same value.

Address 1 field to Address 4 field are used to indicate a BSSID, a source address (SA), a destination address (DA), a transmission address (TA) indicating the address of a transmission STA, and a receiving address (RA) indicating the address of a reception STA.

Meanwhile, the address field implemented as the TA field may be set to a bandwidth signaling TA value. In this case, the TA field may indicate that the corresponding MAC frame has additional information to the scrambling sequence. Although the bandwidth signaling TA is indicated by the MAC address of an STA sending a corresponding MAC frame, an individual/group bit included in the MAC address may be set as a specific value (e.g., '1').

The Sequence Control field is configured to include a sequence number and a fragment number. The sequence number may indicate the number of sequence allocated to the corresponding MAC frame. The fragment number may indicate the number of each fragment of the corresponding MAC frame.

The QoS Control field includes information related to QoS. The QoS control field may be included in the case that a QoS data frame is indicated in a Subtype subfield.

The HT Control filed includes control information related to HT and/or VHT transmission and reception techniques. The HT Control field is included in the Control Wrapper frame. Furthermore, the HT Control field is present in the QoS data frame of which Order subfield value is 1, and existed in Management frame.

The Frame Body is defined as MAC payload, and data to be transmitted in a higher layer is located therein. Furthermore, the Frame body has a variable size. For example, a maximum size of an MPDU may be 11454 octets, and a maximum size of a PPDU may be 5.484 ms.

The FCS is defined as a MAC footer and used to search for an error of the MAC frame.

The first three fields (i.e., the Frame Control field, the Duration/ID field and the Address 1 field) and the last field (i.e., the FCS field) configure a minimum frame format, and are present in all frames. Other fields may be present in a specific frame type.

FIG. 7 illustrates the HT format of the HT Control field in a wireless communication system to which an embodiment of the present invention may be applied.

Referring to FIG. 7, the HT Control field may include a VHT subfield, an HT Control Middle subfield, an AC Constraint subfield and a Reverse Direction Grant (RDG)/More PPDU subfield.

The VHT subfield indicates whether the HT Control field has the format of a HT Control field for VHT (VHT=1) or the format of an HT Control field for HT (VHT=0). In FIG. 7, the HT Control field for HT (i.e., VHT=0) is assumed and described.

The HT Control Middle subfield may be implemented to have a different format depending on the indication of the VHT subfield. The HT Control Middle subfield is described in more detail later.

The AC Constraint subfield indicates whether a mapped access category (AC) of a reverse direction (RD) data frame has been limited to a single AC.

The RDG/More PPDU subfield may be differently interpreted depending on whether a corresponding field is transmitted by an RD initiator or an RD responder.

If a corresponding field is transmitted by an RD initiator, the RDG/More PPDU subfield is set to "0" if an RDG is present and is set to "1" if an RDG is not present. If a corresponding field is transmitted by an RD responder, the RDG/More PPDU subfield is set to "1" if a PPDU including the corresponding subfield is the last frame transmitted by the RD responder and is set to "0" if a different PPDU is transmitted.

The HT Control Middle subfield of the HT Control field for HT may include a link adaptation subfield, a calibration position subfield, a calibration sequence subfield, a reserved subfield, a channel state information (CSI)/steering subfield, an HT null data packet (NDP) announcement subfield, and a reserved subfield.

The Link Adaptation subfield may include a training request (TRQ) subfield, a modulation and coding scheme (MCS) request or antenna selection (ASEL) indication (MAI) subfield, an MCS feedback sequence identifier (MFSI) subfield, and an MCS feedback, and an antenna selection command/data (MFB/ASELC) subfield.

The TRQ subfield is set to "1" if the transmission of a sounding PPDU is requested from a responder and is set to "0" if the transmission of a sounding PPDU is not requested from a responder.

If the MAI subfield is set to 14, it indicates ASEL indication and the MFB/ASELC subfield is interpreted as an antenna selection command/data. If not, the MAI subfield indicates an MCS request and the MFB/ASELC subfield is interpreted as MCS feedback.

If the MAI subfield indicates an MCS request (MRQ), the MAI subfield is interpreted as including an MCS request (MRQ) and an MRQ sequence identifier (MSI). The MRQ subfield is set to "1" if MCS feedback is requested and is set to "0" if MCS feedback is not requested. When the MRQ subfield is "1", the MSI subfield includes a sequence number for specifying an MCS feedback request. When the MRQ subfield is "0", the MSI subfield is set as reserved bits.

Each of the aforementioned subfields corresponds to an example of subfields which may be included in the HT control field or may be substituted with another subfield or may further include an additional subfield.

FIG. 8 illustrates the VHT format of the HT Control field in a wireless communication system to which an embodiment of the present invention may be applied.

Referring to FIG. 8, the HT Control field may include a VHT subfield, an HT Control Middle subfield, an AC Constraint subfield and a Reverse Direction Grant (RDG)/More PPDU subfield.

In FIG. 8, the HT Control field for VHT (i.e., VHT=1) is assumed and described. The HT Control field for VHT may be called a VHT Control field.

A description of the AC Constraint subfield and the RDG/More PPDU subfield is the same as that of FIG. 7, and thus a description thereof is omitted.

As described above, the HT Control Middle subfield may be implemented to have a different format depending on the indication of the VHT subfield.

The HT Control Middle subfield of the HT Control field for VHT may include Reserved bits, a modulation and coding scheme (MCS) feedback request (MRQ) subfield, an MRQ sequence identifier (MSI)/space-time block coding (STBC) subfield, an MCS feedback sequence identifier (MFSI)/least significant bit (LSB) of group ID (GID-L) subfield, an MCS feedback (MFB) subfield, a most significant bit (MSB) of group ID (GID-H) subfield, a Coding Type subfield, a feedback transmission type (FB Tx) subfield, and an unsolicited MFB subfield.

Table 3 shows a description of the subfields included in the HT Control Middle subfield of the VHT format.

TABLE 3

| SUBFIELD | MEANING | DEFINITION |
|---|---|---|
| MRQ | MCS request | The MRQ subfield is set to "1" if MCS feedback (solicited MFB) is requested. The MRQ subfield is set to "0" if not. |
| MSI | MRQ sequence identifier | If the unsolicited MFB subfield is "0" and the MRQ subfield is set to "1", the MSI subfield includes a sequence number within a range of 0 to 6 identifying a specific request. If the unsolicited MFB subfield is "1", the MSI subfield includes a compressed MSI subfield (2 bits) and an STBC indication subfield (1 bit). |
| MFSI/GID-L | MFB sequence identifier/LSB of Group ID | If the unsolicited MFB subfield is "0", the MFSI/GID-L subfield includes the received value of an MSI included in a frame related to MFB information. If the unsolicited MFB subfield is set to "1" and MFB has been estimated from an MU PPDU, the MFSI/GID-L subfield includes the LSB 3 bits of the group ID of a PPDU whose MFB has been estimated. |
| MFB | VHT N_STS, MCS, BW, SNR feedback | The MFB subfield includes a recommended MFB. VHT-MCS = 15, NUM_STS = 7 indicates that feedback is not present. |
| GID-H | MSB of Group ID | If the unsolicited MFB subfield is set to "1" and MFB has been estimated from a VHT MU PPDU, the GID-H subfield includes the MSB 3 bits of the group ID of a PPDU whose unsolicited MFB has been estimated. If MFB has been estimated from an SU PPDU, all of the GID-H subfields are set to "1." |
| Coding Type | Coding type of MFB response | If the unsolicited MFB subfield is set to "1", the Coding Type subfield includes the coding type (binary convolutional code (BCC) is 0 and low-density parity check (LDPC) is 1) of a frame whose unsolicited MFB has been estimated. |
| FB Tx Type | Transmission type of MFB response | If the unsolicited MFB subfield is set to "1" and MFB has been estimated from an unbeamformed VHT PPDU, the FB Tx Type subfield is set to "0." If the unsolicited MFB subfield is set to "1" and MFB has been estimated from a beamformed VHT PPDU, the FB Tx Type subfield is set to "1." |
| Unsolicited MFB | Unsolicited MCS feedback indicator | If MFB is a response to an MRQ, the Unsolicited MFB subfield is set to "1." If MFB is not a response to an MRQ, the Unsolicited MFB subfield is set to "0." |

Furthermore, the MFB subfield may include a VHT number of space time streams (NUM_STS) subfield, a VHT-MCS subfield, a bandwidth (BW) subfield, and a signal to noise ratio (SNR) subfield.

The NUM_STS subfield indicates the number of recommended spatial streams. The VHT-MCS subfield indicates a recommended MCS. The BW subfield indicates bandwidth information related to a recommended MCS. The SNR subfield indicates an average SNR value on a data subcarrier and a spatial stream.

The pieces of information included in each of the aforementioned fields may comply with the definition of an IEEE 802.11 system. Furthermore, the aforementioned fields correspond to examples of fields which may be included in the MAC frame, but are not limited thereto. That is, each of the aforementioned fields may be substituted with a different field or may further include an additional field, and all of the fields may not be essentially included.

Link Setup Procedure

FIG. 9 is a diagram for illustrating a known link setup procedure in a wireless communication system to which an embodiment of the present invention may be applied.

In order to set up a link with a network and to send or receive data, first, an STA needs to experience a scanning procedure for discovering a network, an authentication procedure and an association procedure. A link setup procedure may also be called a session initiation procedure or a session setup procedure. Furthermore, the scanning, authentication and association procedures of the link setup procedure may be collectively called an association procedure.

In a WLAN, the scanning procedure includes a passive scanning procedure and an active scanning procedure.

FIG. 9(a) illustrates a link setup procedure according to passive scanning, and FIG. 9(b) illustrates a link setup procedure according to active scanning.

As shown in FIG. 9(a), the passive scanning procedure is performed through a beacon frame periodically broadcasted by an AP. The beacon frame is one of management frames in IEEE 802.11, and is periodically (e.g., at 100 msec spacing) broadcasted in order to provide notification of the presence of a wireless network and to allow a non-AP STA that performs scanning to discover a wireless network and to participate in the wireless network. Information about a current network (e.g., information about a BSS) is loaded onto the beacon frame.

In order to obtain information about a network, a non-AP STA waits for the reception of a beacon frame while passively changing channels. The non-AP STA that has received the beacon frame may store information about a network included in the received beacon frame, may move to a next channel, and may perform scanning in the next channel in the same manner. When the non-AP STA receives the beacon frame and obtains the information about the network, a scanning procedure in a corresponding channel is completed.

As described above, the passive scanning procedure has an advantage in that overall overhead is low because the procedure is completed if a non-AP STA has only to receive a beacon frame without a need to send another frame. However, the passive scanning procedure has a disadvantage in that the time taken for a non-AP STA to perform scanning is increased in proportion to the transmission period of a beacon frame.

In contrast, an active scanning procedure, such as that of FIG. 9(b), requires network information from all of APs which have received a probe request frame because a non-AP STA broadcasts the probe request frame while actively changing channels in order to discover whether which AP is present nearby.

A responder that has received the probe request frame waits for a random time in order to prevent a frame collision, loads network information onto a probe response frame, and sends a probe response frame to a corresponding non-AP STA. The STA that has received the probe response frame may store network-related information included in the received probe response frame, may move to a next channel, and may perform scanning in the same manner. When the non-AP STA obtains the network information by receiving the probe response frame, the scanning procedure is completed.

The active scanning procedure has an advantage in that scanning can be completed within a relatively shorter time compared to the passive scanning procedure, but overall network overhead is increased because an additional frame sequence is required.

The non-AP STA that has completed the scanning procedure selects a network based on its criterion and then performs an authentication procedure along with the corresponding AP.

The authentication procedure is performed according to a process of sending, by the non-AP STA, an authentication request frame to the AP and a process of sending, by the AP, an authentication response frame to the non-AP STA in response to the authentication request frame, that is, through 2-way handshaking.

The authentication frame used in the authentication request/response corresponds to a management frame.

The authentication frame may include information about an authentication algorithm number, an authentication transaction sequence number, status code, challenge text, a robust security network (RSN), and a finite cyclic group. The information corresponds to some examples of pieces of information which may be included in the authentication request/response frame and may be substituted with different information or may further include additional information.

The non-AP STA may send an authentication request frame to the AP. The AP may determine whether or not to permit authentication for the non-AP STA based on information included in the received authentication request frame. The AP may provide the non-AP STA with a result of the authentication processing through an authentication response frame.

After performing the authentication through the authentication procedure, the non-AP STA and the AP establishes association.

The association process is performed according to a process of sending, by the non-AP STA, an association request frame to the AP and a process of sending, by the AP, an association response frame to the non-AP STA in response to the association request frame, that is, through 2-way handshaking.

The association request frame may include information about information related to various capabilities, beacon listen interval, service set identifier (SSID), supported rates, supported channels, RSN, mobility domain, supported operating classes, traffic indication map (TIM) broadcast request, and interworking service capability of the non-AP STA.

The AP determines whether support can be provided to the corresponding non-AP STA based on the information. After determining whether the support can be provided, the AP includes information about whether an association request has been accepted or not, a reason thereof, and its capability information in an association response frame, and sends the association response frame to the non-AP STA.

The association response frame may include information, such as information related to various capabilities, status code, an association ID (AID), supported rates, an enhanced distributed channel access (EDCA) parameter set, a received channel power indicator (RCPI), a received signal to noise indicator (RSNI), a mobility domain, an association comeback time, an overlapping BSS scan parameter, a TIM broadcast response, and a quality of service (QoS) map.

Pieces of information which may be included in the aforementioned association request/response frame correspond to examples and may be substituted with different information or may further include additional information.

If association has been successfully established between the non-AP STA and the AP, normal transmission and reception are performed. In contrast, if association with the AP is not successfully established, the non-AP STA may attempt an association procedure again based on a corresponding reason or may attempt association with another AP.

Medium Access Mechanism

In IEEE 802.11, communication is basically different from that of a wired channel environment because it is performed in a shared wireless medium.

In a wired channel environment, communication is possible based on carrier sense multiple access/collision detection (CSMA/CD). For example, when a signal is once transmitted by a transmission end, it is transmitted up to a reception end without experiencing great signal attenuation because there is no great change in a channel environment. In this case, when a collision between two or more signals is detected, detection is possible. The reason for this is that power detected by the reception end becomes instantly higher than power transmitted by the transmission end. In a radio channel environment, however, since various factors (e.g., signal attenuation is great depending on the distance or instant deep fading may be generated) affect a channel, a transmission end is unable to accurately perform carrier sensing regarding whether a signal has been correctly transmitted by a reception end or a collision has been generated.

Accordingly, in a WLAN system according to IEEE 802.11, a carrier sense multiple access with collision avoidance (CSMA/CA) mechanism has been introduced as the basic access mechanism of MAC. The CAMA/CA mechanism is also called a distributed coordination function (DCF) of IEEE 802.11 MAC, and basically adopts a "listen before talk" access mechanism. In accordance with such a type of access mechanism, an AP and/or an STA perform clear channel assessment (CCA) for sensing a radio channel or a medium for a specific time interval (e.g., a DCF inter-frame space (DIFS)) prior to transmission. If, as a result of the sensing, the medium is determined to be an idle state, the AP and/or the STA starts to transmit a frame through the corresponding medium. In contrast, if, as a result of the sensing, the medium is determined to be a busy state (or an occupied status), the AP and/or the STA do not start their transmission, may wait for a delay time (e.g., a random backoff period) for medium access in addition to the DIFS assuming that several STAs already wait for in order to use the corresponding medium, and may then attempt frame transmission.

Assuming that several STAs trying to transmit frames are present, they will wait for different times because the STAs stochastically have different backoff period values and will attempt frame transmission. In this case, a collision can be minimized by applying the random backoff period.

Furthermore, the IEEE 802.11 MAC protocol provides a hybrid coordination function (HCF). The HCF is based on a DCF and a point coordination function (PCF). The PCF is a polling-based synchronous access method, and refers to a method for periodically performing polling so that all of receiving APs and/or STAs can receive a data frame. Furthermore, the HCF has enhanced distributed channel access (EDCA) and HCF controlled channel access (HCCA). In EDCA, a provider performs an access method for providing a data frame to multiple users on a contention basis. In HCCA, a non-contention-based channel access method using a polling mechanism is used. Furthermore, the HCF includes a medium access mechanism for improving the quality of service (QoS) of a WLAN, and may transmit QoS data in both a contention period (CP) and a contention-free period (CFP).

FIG. 10 is a diagram illustrating a random backoff period and a frame transmission procedure in a wireless communication system to which an embodiment of the present invention may be applied.

When a specific medium switches from an occupied (or busy) state to an idle state, several STAs may attempt to transmit data (or frames). In this case, as a scheme for minimizing a collision, each of the STAs may select a random backoff count, may wait for a slot time corresponding to the selected random backoff count, and may attempt transmission. The random backoff count has a pseudo-random integer value and may be determined as one of uniformly distributed values in 0 to a contention window (CW) range. In this case, the CW is a CW parameter value. In the CW parameter, CW_min is given as an initial value. If transmission fails (e.g., if ACK for a transmitted frame is not received), the CW_min may have a twice value. If the CW parameter becomes CW_max, it may maintain the CW_max value until data transmission is successful, and the data transmission may be attempted. If the data transmission is successful, the CW parameter is reset to a CW_min value. The CW, CW_min, and CW_max values may be set to $2^n-1$ (n=0, 1, 2, . . . ).

When a random backoff process starts, an STA counts down a backoff slot based on a determined backoff count value and continues to monitor a medium during the countdown. When the medium is monitored as a busy state, the STA stops the countdown and waits. When the medium becomes an idle state, the STA resumes the countdown.

In the example of FIG. 10, when a packet to be transmitted in the MAC of an STA 3 is reached, the STA 3 may check that a medium is an idle state by a DIFS and may immediately transmit a frame.

The remaining STAs monitor that the medium is the busy state and wait. In the meantime, data to be transmitted by each of an STA 1, an STA 2, and an STA 5 may be generated. When the medium is monitored as an idle state, each of the STAs waits for a DIFS and counts down a backoff slot based on each selected random backoff count value.

The example of FIG. 10 shows that the STA 2 has selected the smallest backoff count value and the STA 1 has selected the greatest backoff count value. That is, FIG. 10 illustrates that the remaining backoff time of the STA 5 is shorter than the remaining backoff time of the STA 1 at a point of time at which the STA 2 finishes a backoff count and starts frame transmission.

The STA 1 and the STA 5 stop countdown and wait while the STA 2 occupies the medium. When the occupation of the medium by the STA is finished and the medium becomes an idle state again, each of the STA 1 and the STA 5 waits for a DIFS and resumes the stopped backoff count. That is, each of the STA 1 and the STA 5 may start frame transmission after counting down the remaining backoff slot corresponding to the remaining backoff time. The STA 5 starts frame transmission because the STA 5 has a shorter remaining backoff time than the STA 1.

While the STA 2 occupies the medium, data to be transmitted by an STA 4 may be generated. In this case, from a standpoint of the STA 4, when the medium becomes an idle state, the STA 4 waits for a DIFS and counts down a backoff slot corresponding to its selected random backoff count value.

FIG. 10 shows an example in which the remaining backoff time of the STA 5 coincides with the random backoff count value of the STA 4. In this case, a collision may be generated between the STA 4 and the STA 5. When a collision is generated, both the STA 4 and the STA 5 do not receive ACK, so data transmission fails. In this case, each of the STA 4 and the STA 5 doubles its CW value, select a random backoff count value, and counts down a backoff slot.

The STA 1 waits while the medium is the busy state due to the transmission of the STA 4 and the STA 5. When the medium becomes an idle state, the STA 1 may wait for a DIFS and start frame transmission after the remaining backoff time elapses.

The CSMA/CA mechanism includes virtual carrier sensing in addition to physical carrier sensing in which an AP and/or an STA directly sense a medium.

Virtual carrier sensing is for supplementing a problem which may be generated in terms of medium access, such as a hidden node problem. For the virtual carrier sensing, the MAC of a WLAN system uses a network allocation vector (NAV). The NAV is a value indicated by an AP and/or an STA which now uses a medium or has the right to use the medium in order to notify another AP and/or STA of the remaining time until the medium becomes an available state. Accordingly, a value set as the NAV corresponds to the period in which a medium is reserved to be used by an AP and/or an STA that transmit corresponding frames.

An AP and/or an STA may perform a procedure for exchanging a request to send (RTS) frame and a clear to send (CTS) frame in order to provide notification that they will access a medium. The RTS frame and the CTS frame include information indicating a temporal section in which a wireless medium required to transmit/receive an ACK frame has been reserved to be accessed if substantial data frame transmission and an acknowledgement response (ACK) are supported. Another STA which has received an RTS frame from an AP and/or an STA attempting to send a frame or which has received a CTS frame transmitted by an STA to which a frame will be transmitted may be configured to not access a medium during a temporal section indicated by information included in the RTS/CTS frame. This may be implemented by setting the NAV during a time interval.

Residual Carrier Frequency Offset Measurement and Channel Estimation

In an 802.11ac system, a residual carrier frequency offset (CFO) is measured using a pilot. More specifically, the same pilot is allocated to the same tone (or subcarrier) for each symbol, the same coefficient is set, and a residual CFO is measured by measuring a phase difference in the pilot value between symbols.

Furthermore, channel estimation is performed in the VHT-LTF. Orthogonality may be generated between the symbol and stream of the same subcarrier by multiplying a P matrix, and channel estimation may be measured using the orthogonality. A P matrix means a matrix having orthogonality for each of rows that form the P matrix.

As described above, the VHT-LTF may be set by the number of space-time streams in which a PPDU is transmitted.

Table 4 illustrates the number of VHT-LTFs.

TABLE 4

| Number of space-time streams | 1 | 2 | 3 | 4 | 5 | 6 | 7 | 8 |
|---|---|---|---|---|---|---|---|---|
| Number of VHT-LTFs | 1 | 2 | 4 | 4 | 6 | 6 | 8 | 8 |

Equations 1 to 4 illustrate P matrix values.

$$P_{VHTLTF} = \begin{cases} P_{4\times4}, N_{STS,total} \leq 4 \\ P_{6\times6}, N_{STS,total} = 5, 6 \\ P_{8\times8}, N_{STS,total} = 7, 8 \end{cases} \quad \text{[Equation 1]}$$

Referring to Equation 1, a P_4×4 matrix is used when a total number of space-time streams (N_STS,total) within a PPDU is 4 or less (Equation 2), a P_6×6 matrix is used when the total number of space-time streams is 5 or 6 (Equation 3), and a P_8×8 is used when if the total number of space-time streams is 7 or 8 (Equation 4).

$$P_{4\times4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix} \quad \text{[Equation 2]}$$

$$P_{6\times6} = \begin{bmatrix} 1 & -1 & 1 & 1 & 1 & -1 \\ 1 & -w^1 & w^2 & w^3 & w^4 & -w^5 \\ 1 & -w^2 & w^4 & w^6 & w^8 & -w^{10} \\ 1 & -w^3 & w^6 & w^9 & w^{12} & -w^{15} \\ 1 & -w^4 & w^8 & w^{12} & w^{16} & -w^{20} \\ 1 & -w^5 & w^{10} & w^{15} & w^{20} & -w^{25} \end{bmatrix} \quad \text{[Equation 3]}$$

where $w = \exp(-j2\pi/6)$ $$P_{8\times8} = \begin{bmatrix} P_{4\times4} & P_{4\times4} \\ P_{4\times4} & -P_{4\times4} \end{bmatrix} \quad \text{[Equation 4]}$$

FIG. 11 is a diagram illustrating a VHT-LTF in a wireless communication system to which an embodiment of the present invention may be applied.

FIG. 11 shows an example in which the number of space-time streams is 4.

In the P matrices illustrated in Equations 2 to 4, each row corresponds to each space-time stream. As in FIG. 11, VHT-LTFs are multiplied by each matrix element.

Referring to FIG. 11, the 4 VHT-LTFs of a space-time stream 1 are multiplied by respective matrix elements that belong to the first row of Equation 2. The first VHT-LTF sequence element is multiplied by 1, the second VHT-LTF sequence element is multiplied by -1, the third VHT-LTF sequence element is multiplied by 1, and the fourth VHT-LTF sequence element is multiplied by 1.

Other space-time streams are multiplied by P matrices as described above.

Method for Uplink Multi-User Transmission

In a situation in which a lot of interest in next-generation Wi-Fi by vendors of various fields and a demand for high throughput and quality of experience (QOE) performance improvement after 802.11ac is increasing, a new frame format and numerology for an 802.11ax system, that is, a next-generation WLAN system, are actively discussed.

IEEE 802.11ax is one of WLAN systems that have recently been newly proposed as a next-generation WLAN system for supporting a higher data rate and processing a higher user load, and is referred to as a so-called high efficiency WLAN (HEW).

An IEEE 802.11ax WLAN system may operate in a 2.4 GHz frequency band and 5 GHz frequency band like the existing WLAN system. Furthermore, the IEEE 802.11ax WLAN system may operate in a higher 60 GHz frequency band.

In the IEEE 802.11ax system, for the purpose of average throughput enhancement and outdoor robust transmission against inter-symbol interference in an outdoor environment, an FFT size that is four times in each bandwidth compared to the existing IEEE 802.11 OFDM systems (IEEE 802.11a, 802.11n, 802.11ac) may be used. This is described below with reference to the drawing.

In a description of an HE format PPDU according to an embodiment of the present invention, the aforementioned descriptions of the non-HT format PPDU, the HT-mixed format PPDU, the HT-green field format PPDU and/or the VHT format PPDU may be merged into the description of the HE format PPDU unless they are mentioned otherwise.

FIG. 12 is a diagram illustrating a high efficiency (HE) format PPDU according to an embodiment of the present invention.

Referring to FIG. 12, the HE format PPDU for an HEW may basically include a legacy (L)-part and an HE-part.

The L-part includes an L-STF field, an L-LTF field and an L-SIG field like a form which is maintained in the existing WLAN system. The L-STF field, the L-LTF field and the L-SIG field may be called a legacy preamble.

The HE-part is a portion newly defined for the 802.11ax standard, and may include an HE-SIG field and an HE-preamble & HE-data field. Furthermore, the HE-preamble may include an HE-STF field and an HE-LTF field. Furthermore, the HE-SIG field in addition to the HE-STF field and the HE-LTF field may be collectively called an HE-preamble.

FIG. 12 illustrates that the HE-SIG field, the HE-STF field and the HE-LTF field have been sequentially disposed, but the HE-SIG field, the HE-STF field and the HE-LTF field may be disposed in a different sequence.

The L-part, the HE-SIG field and the HE-preamble may be collectively called a physical (PHY) preamble.

The HE-SIG field may include information (e.g., OFDMA, UL MU MIMO and/or an improved MCS) for decoding the HE-data field.

The L-part and the HE-part (more specifically, the HE-preamble and HE-data field) may have different fast Fourier transform (FFT) sizes and may use different cyclic prefixes (CPs). That is, subcarrier frequency spacing may be differently defined in each of the L-part and the HE-part (more specifically, the HE-preamble and HE-data field).

In the 802.11ax system, a (4×) FFT size may be used compared to a legacy WLAN system. That is, the L-part may have a 1× symbol structure, and the HE-part (more specifically, the HE-preamble and HE-data field) may have a 4× symbol structure. In this case, FFT of a 1×, 2× or 4× size means a relative size with respect to a legacy WLAN system (e.g., IEEE 802.11a, 802.11n or 802.11ac).

For example, if FFT sizes used in the L-part are 64, 128, 256, and 512 in 20 MHz, 40 MHz, 80 MHz, and 160 MHz, respectively, FFT sizes used in the HE-part may be 256, 512, 1024, and 2048 in 20 MHz, 40 MHz, 80 MHz, and 160 MHz, respectively.

As described above, if the FFT size increases compared to a legacy WLAN system, subcarrier frequency spacing is reduced. Accordingly, the number of subcarriers per unit frequency is increased, but the length of an OFDM symbol is increased.

That is, this means that if a greater FFT size is used, subcarrier spacing is narrowed. Likewise, this means that an inverse discrete Fourier transform (IDFT)/discrete Fourier transform (DFT) period is increased. In this case, the IDFT/DFT period may mean a symbol length other than a guard interval (GI) in an OFDM symbol.

Accordingly, if an FFT size that is four times greater than the L-part is used in the HE-part (more specifically, the HE-preamble and HE-data field), the subcarrier spacing of the HE-part is ¼ of the subcarrier spacing of the L-part, and the IDFT/DFT period of the HE-part is four times the IDFT/DFT period of the L-part. For example, if the subcarrier spacing of the L-part is 312.5 kHz (=20 MHz/64, 40 MHZ/128, 80 MHz/256 and/or 160 MHz/512), the subcarrier spacing of the HE-part may be 78.125 kHz (=20 MHz/256, 40 MHZ/512, 80 MHz/1024 and/or 160 MHz/2048). Furthermore, if the IDFT/DFT period of the L-part is 3.2 µs (=1/312.5 kHz), the IDFT/DFT period of the HE-part may be 12.8 (=1/78.125 kHz).

In this case, since one of 0.8 µs, 1.6 µs and 3.2 µs may be used as a GI, the OFDM symbol length (or symbol interval) of the HE-part including the GI may be 13.6 µs, 14.4 µs or 16 µs depending on the GI.

FIG. 12 shows an example in which the HE-SIG field has a 1× symbol structure, but the HE-SIG field may also have a 4× symbol structure as in the HE-preamble and HE-data field.

Unlike in the example of FIG. 12, the HE-SIG field may be divided into an HE-SIG A field and an HE-SIG B field. In this case, the FFT size per unit frequency may further increase after the HE-SIG B field. That is, the length of an OFDM symbol may be increased compared to the L-part after the HE-SIG B field.

An HE format PPDU for a WLAN system to which an embodiment of the present invention may be applied may be transmitted through at least one 20 MHz channel. For example, the HE format PPDU may be transmitted through a total of four 20 MHz channels in a 40 MHz, 80 MHz or 160 MHz frequency band. This is described in more detail below with reference to the drawing.

FIG. 13 is a diagram illustrating an HE format PPDU according to an embodiment of the present invention.

FIG. 13 shows an example of a PPDU format if 80 MHz has been allocated to one STA (or if an OFDMA resource unit has been allocated to a plurality of STAs within 80 MHz) or if different streams of 80 MHz have been allocated to a plurality of STAs.

Referring to FIG. 13, an L-STF, an L-LTF and an L-SIG field may be transmitted in an OFDM symbol generated based on 64 FFT points (or 64 subcarriers) in respective 20 MHz channels.

HE-SIG A fields may include common control information transmitted to STAs that receive the PPDU in common. The HE-SIG A fields may be transmitted in one to three OFDM symbols. The HE-SIG A field is duplicated for each 20 MHz and includes the same information. Furthermore, the HE-SIG A field provides notification of the entire bandwidth information of a system.

Table 5 illustrates information included in the HE-SIG A field.

TABLE 5

| FIELD | BITS | DESCRIPTION |
|---|---|---|
| Bandwidth | 2 | Indicates a bandwidth in which a PPDU is transmitted. For example, 20 MHz, 40 MHz, 80 MHz or 160 MHz |
| Group ID | 6 | Indicates an STA or a group of STAs which will receive a PPDU |
| Stream information | 12 | Indicates the location or number of spatial streams for each STA or indicates the location or numbers of spatial streams for a group of STAs |
| UL indication | 1 | Indicate whether a PPDU is directed toward an AP (uplink) or directed toward an STA (downlink) |
| MU indication | 1 | Indicate whether a PPDU is an SU-MIMO PPDU or an MU-MIMO PPDU |
| GI indication | 1 | Indicates whether a short GI is used or a long GI is used |
| Allocation information | 12 | Indicates a band or channel (a subchannel index or a subband index) allocated to each STA in a band in which a PPDU is transmitted |
| Transmission power | 12 | Indicate transmission power for each channel or each STA |

The pieces of information included in each of the fields illustrated in Table 5 may comply with the definition of the IEEE 802.11 system. Furthermore, each of the aforementioned fields corresponds to an example of fields which may be included in the PPDU, but is not limited thereto. That is, each of the aforementioned fields may be substituted with a different field or may further include an additional field and all of the fields may not be essentially included.

The HE-STF is used to improve AGC estimation performance in MIMO transmission.

The HE-SIG B field may include user-specific information which is required for each STA to receive its own data (e.g., a PSDU). The HE-SIG B field may be transmitted in one or two OFDM symbols. For example, the HE-SIG B field may include information about the modulation and coding scheme (MCS) of a corresponding PSDU and the length of a corresponding PSDU.

Each of the L-STF, the L-LTF, the L-SIG field and the HE-SIG A field may be repeated for each 20 MHz channel and transmitted. For example, if a PPDU is transmitted through four 20 MHz channels (i.e., an 80 MHz band), the L-STF, the L-LTF, the L-SIG field and the HE-SIG A field may be repeated every 20 MHz channel and transmitted.

If the FFT size increases, a legacy STA supporting the existing IEEE 802.11a/g/n/ac may not decode a corresponding HE PPDU. In order for a legacy STA and an HE STA to coexist, the L-STF, the L-LTF and the L-SIG field are transmitted through 64 FFT in a 20 MHz channel so that a legacy STA can receive them. For example, the L-SIG field may occupy one OFDM symbol, may have one OFDM symbol time of 4 and may have a GI of 0.8 μs.

An FFT size for each frequency unit may further increase from the HE-STF. For example, 256 FFT may be used in a 20 MHz channel, 512 FFT may be used in a 40 MHz channel, and 1024 FFT may be used in an 80 MHz channel. If the FFT size increases, the number of OFDM subcarriers per unit frequency increases because spacing between OFDM subcarriers decreases, but an OFDM symbol time increases. In order to improve system efficiency, the length of a GI after the HE-STF may be set identically with the length of the GI of the HE-SIG A field.

The HE-SIG A field may include information that is necessary for an HE STA to decode the HE PPDU. However, the HE-SIG A field may be transmitted through 64 FFT in a 20 MHz channel so that both a legacy STA and an HE STA are able to receive the HE-SIG A field. The reason for this is that the HE STA has to receive the existing HT/VHT format PPDU in addition to the HE format PPDU and the legacy STA and the HE STA have to be able to distinguish the HT/VHT format PPDU and the HE format PPDU.

FIG. 14 is a diagram illustrating an HE format PPDU according to an embodiment of the present invention.

In FIG. 14, it is assumed that 20 MHz channels are allocated to different STAs (e.g., an STA 1, an STA 2, an STA 3 and an STA 4).

Referring to FIG. 14, an FFT size per unit frequency may further increase from an HE-STF (or an HE-SIG B field). For example, 256 FFT may be used in a 20 MHz channel from the HE-STF (or the HE-SIG B field), 512 FFT may be used in a 40 MHz channel, and 1024 FFT may be used in an 80 MHz channel.

Information transmitted in each of the fields included in the PPDU is the same as the example of FIG. 13, and thus a description thereof is omitted.

The HE-SIG B field may include information specific to each STA, but may be encoded over a full band (i.e., indicated in an HE-SIG A field). That is, the HE-SIG B field includes information about all of the STAs, and all of the STAs receive the HE-SIG B field.

The HE-SIG B field may provide notification of frequency bandwidth information allocated to each STA and/or stream information allocated to each STA in a corresponding frequency band. For example, in the HE-SIG-B field of FIG. 14, 20 MHz may be allocated to the STA 1, next 20 MHz may be allocated to the STA 2, next 20 MHz may be allocated to the STA 3, and next 20 MHz may be allocated to the STA 4. Furthermore, 40 MHz may be allocated to the STA 1 and the STA 2, and next 40 MHz may be allocated to the STA 3 and the STA 4. In this case, different streams may be allocated to the STA 1 and the STA 2, and different streams may be allocated to the STA 3 and the STA 4.

Furthermore, an HE-SIG-C field may be defined and added to the example of FIG. 14. In this case, information about all of the STAs may be transmitted over a full band in the HE-SIG B field, and control information specific to each STA may be transmitted for each 20 MHz through the HE-SIG-C field.

Furthermore, as in the examples of FIGS. 13 and 14, the HE-SIG B field is not transmitted over a full band, but may be transmitted for each 20 MHz like the HE-SIG A field. This is described below with reference to the drawing.

FIG. 15 is a diagram illustrating an HE format PPDU according to an embodiment of the present invention.

In FIG. 15, it is assumed that 20 MHz channels are allocated to different STAs (e.g., an STA 1, an STA 2, an STA 3 and an STA 4).

Referring to FIG. 15, an HE-SIG B field is not transmitted over a full band, but is transmitted for each 20 MHz like an HE-SIG A field. In this case, however, the HE-SIG-B field is encoded for each 20 MHz and transmitted unlike the HE-SIG A field, but may not be duplicated for each 20 MHz and transmitted.

In this case, an FFT size per unit frequency may further increase from an HE-STF (or the HE-SIG B field). For example, 256 FFT may be used in a 20 MHz channel, 512 FFT may be used in a 40 MHz channel and 1024 FFT may be used in an 80 MHz channel from the HE-STF (or the HE-SIG B field).

Information transmitted in each of the fields included in the PPDU is the same as the example of FIG. 13, and thus a description thereof is omitted.

The HE-SIG A field is duplicated for each 20 MHz and transmitted.

The HE-SIG B field may provide notification of frequency bandwidth information allocated to each STA and/or stream information allocated to each STA in a corresponding frequency band. The HE-SIG B field includes information about each STA, and thus information about each STA may be included in each HE-SIG B field of each 20 MHz. In this case, FIG. 15 shows an example in which 20 MHz is allocated to each STA. For example, if 40 MHz is allocated to each STA, the HE-SIG B field may be duplicated for each 20 MHz and transmitted.

In a situation in which BBSs support different bandwidths, if some bandwidth having a small interference level from a neighbor BSS is allocated to an STA, it may be preferred that the HE-SIG B field is not transmitted over a full band as described above.

In FIGS. 12 to 15, a data field is payload and may include a service field, a scrambled PSDU, tail bits, and padding bits.

The HE format PPDUs shown in FIGS. 12 to 15 may be distinguished through a repeated L-SIG (RL-SIG) field, that is, a repetition symbol of an L-SIG field. The RL-SIG field is inserted before the HE SIG-A field, and each STA may distinguish the format of a received PPDU as an HE format PPDU using the RL-SIG field.

A method of sending, by an AP operating in a WLAN system, data to a plurality of STAs on the same time resources may be called downlink multi-user (DL MU) transmission. In contrast, a method of sending, by a plurality of STAs operating in a WLAN system, data to an AP on the same time resources may be called uplink multi-user (UL MU) transmission.

Such DL MU transmission or UL MU transmission may be multiplexed on the frequency domain or spatial domain.

If the DL MU transmission or UL MU transmission is multiplexed on the frequency domain, different frequency resources (e.g., subcarriers or tones) may be allocated to a plurality of STAs as uplink or downlink resources based on orthogonal frequency division multiplexing (OFDMA). A transmission method through different frequency resources in the same time resources may be called "DL/UL OFDMA transmission."

If the DL MU transmission or UL MU transmission is multiplexed on the spatial domain, different spatial streams may be allocated to a plurality of STAs as uplink or downlink resources. A transmission method through different spatial streams in the same time resource may be called "DL/UL MU MIMO transmission."

In an IEEE 802.11ax system, the introduction of several technologies is taken into consideration for the purpose of an average throughput increase that is four times or more compared to the existing 802.11ac system. One of the several technologies is 4×FFT. In this structure, a residual CFO needs to be compensated for using a proper method because subcarrier spacing is reduced to ¼ compared to the existing system.

Furthermore, the support of UL MU MIMO and UL OFDMA is also taken into consideration in 802.11ax. In this situation, unlike in the existing single user situation or downlink MU MIMO situation, different CFOs according to users are mixed in a reception end. Accordingly, the existing CFO estimation method using a pilot has a difficulty in accurate CFO measurement for each user.

In order to overcome the difficulty, an embodiment of the present invention proposes a new P matrix-coded LTF method capable of performing channel estimation and CFO measurement at the same time in the UL MU MIMO and/or UL OFDMA transmission situation.

Furthermore, there is also proposed an additional method for overcoming the limit of use of the existing P matrix and a limit dependent on channel correlation. One is a method capable of covering all of numerologies which may be taken into consideration in 11ax using the existing P matrix without defining an additional P matrix, and the other is a method capable of maintaining the number of supportable users without any change while being less influenced by channel correlation.

In the following description of an embodiment of the present invention, the term "user" means an STA participating in UL MU MIMO and/or UL OFDMA transmission.

1. The P Matrix-Coded LTF Method

1-A) Generate an HE-LTF Sequence

A new CFO measurement and channel estimation scheme is proposed as follows assuming that channel correlation is greater in a frequency domain by generating an LTF sequence that is orthogonal for each user using the existing P matrix.

Hereinafter, in describing a method for estimating a CFO and a channel using the P matrix-coded LTF method, it is assumed that the number of users participating in UL MU MIMO and/or UL OFDMA transmission is 2 and a P matrix reuses the P_4×4 matrix illustrated in Equation 2, for convenience of description. Furthermore, it is assumed that one stream has been allocated to each user.

The present invention is not limited to the assumption, and the number of users different from 2 may participate in UL MU MIMO and/or UL OFDMA transmission. Furthermore, a new P matrix that is orthogonal for each row other than the existing defined P matrix may be defined and used. Furthermore, although one or more streams are allocated to each user, the embodiment of the present invention may be identically applied.

FIG. 16 illustrates a method for generating an HE-LTF sequence according to an embodiment of the present invention.

In FIG. 16, L_i (i.e., L_1, L_2, L_3, . . . ) indicates a predefined common HE-LTF sequence. "i" indicates a subcarrier index to which an HE-LTF is mapped.

s_i(k) (i.e., s_1(k), s_2(k), s_3(k), . . . ) indicates a scrambled HE-LTF sequence for a stream k. In this case, "k" indicates a stream index, and "i" indicates a subcarrier index to which an HE-LTF is mapped.

The predefined common HE-LTF sequence L_i is scrambled using a different row (i.e., P matrix code) of a P matrix for each stream.

More specifically, every N_f (e.g., 4) sub-sequences of a common HE-LTF sequence predefined for each stream are multiplied by the matrix elements of a different row of the P matrix. In other words, sequence elements belonging to sub-sequences and matrix elements forming a specific row of the P matrix are sequentially multiplied.

As described above, the scrambled HE-LTF sequence "s_i" is orthogonal for each stream in a unit of N_f (e.g., 4) contiguous sub-sequences of an entry. That is, the HE-LTF sequence scrambled for each stream is piecewise orthogonal.

Referring to FIG. 16, in the case of a stream 1, a predefined common HE-LTF sequence is multiplied (or scrambled) by the matrix elements of the first row of the P matrix to generate an HE-LTF sequence (i.e., an HE-LTF sequence 1). In the case of a stream 2, the HE-LTF sequence is multiplied (or scrambled) by the matrix elements of the second row of the P matrix to generate an HE-LTF sequence (i.e., an HE-LTF sequence 2).

More specifically, in the case of the stream 1, the first HE-LTF sequence element L_1 is multiplied by the first matrix element (i.e., 1) of the first row of the P matrix. The second HE-LTF sequence element L_2 is multiplied by the second matrix element (i.e., −1) of the first row of the P matrix. The third HE-LTF sequence element L_3 is multiplied by the third matrix element (i.e., 1) of the first row of the P matrix. The fourth HE-LTF sequence L_4 is multiplied by the fourth matrix element (i.e., 1) of the first row of the P matrix. Furthermore, the HE-LTF sequence 1(s_i(1)) is generated by repeating (or scrambling) the above process in a unit of four sequences (i.e., L_5~L_8, L_9~L_12, L_13~L_16, . . . ) with respect to the remainder HE-LTF sequence.

Furthermore, in the case of the stream 2, the HE-LTF sequence 2(s_i (2)) is generated by performing (or scrambling) the above process in the same manner using the second row of the P matrix.

The HE-LTF sequence generated by the above method is orthogonal for each stream in a unit of 4 sub-sequences. That is, the HE-LTF sequence 1 and the HE-LTF sequence 2 are orthogonal in a unit of 4 sub-sequences.

Accordingly, in the case of UL MU MIMO and/or UL OFDMA transmission, a different HE-LTF sequence is transmitted for each stream.

1-B) P Matrix Encoding in a Time Domain

As an option, in order to maintain orthogonality in the time domain, P matrix encoding may be additionally applied to the HE-LTF sequence generated by the method 1-A). This is described below with reference to the drawing.

FIG. 17 illustrates a method for configuring an HE-LTF field according to an embodiment of the present invention.

In FIG. 17, c_j(k) (i.e., c_1(k), c_2(k), c_3(k), . . . ) indicates a row (i.e., P matrix code) of a P matrix corresponding to a stream "k." In this case, "k" indicates a stream index and "j" indicates a symbol index.

A scrambled HE-LTF sequence may be mapped to the subcarriers of one or more symbols and transmitted. In this case, the number of symbols in which the scrambled HE-LTF sequence is transmitted (or mapped) (hereinafter referred to as an "HE-LTF symbol") may be determined by the number of streams allocated to UL MU MIMO transmission.

An HE-LTF sequence transmitted in respective symbols is sequentially multiplied by matrix elements of one row (e.g., a row corresponding to a stream k) of the P matrix. That is, a data tone (i.e., a tone to which the HE-LTF sequence is mapped) of an HE-LTF symbol for each stream is multiplied by a different row of the P matrix.

That is, a scrambled HE-LTF sequence "s_i(k)" transmitted in the first HE-LTF symbol is multiplied by the first matrix element (i.e., c_1(k)) of a specific row of the P matrix. A scrambled HE-LTF sequence "s_i(k)" transmitted in the second HE-LTF symbol is multiplied by the second matrix element (i.e., c_2(k)) of a specific row of the P matrix. A scrambled HE-LTF sequence "s_i(k)" transmitted in the third HE-LTF symbol is multiplied by the third matrix element (i.e., c_3(k)) of a specific row of the P matrix. A scrambled HE-LTF sequence "s_i(k)" transmitted in the fourth HE-LTF symbol is multiplied by the fourth matrix element (i.e., c_4(k)) of a specific row of the P matrix.

Referring to FIG. 17, a scrambled HE-LTF sequence mapped to the first HE-LTF symbol is multiplied by the first matrix element (i.e., 1) of the third row of the P matrix. A scrambled HE-LTF sequence mapped to the second HE-LTF symbol is multiplied by the second matrix element (i.e., 1) of the third row of the P matrix. A scrambled HE-LTF sequence mapped to the third HE-LTF symbol is multiplied by the third matrix element (i.e., 1) of the third row of the P matrix. A scrambled HE-LTF sequence mapped to the fourth HE-LTF symbol is multiplied by the fourth matrix element (i.e., −1) of the third row of the P matrix.

As in the example of FIG. 16, orthogonality can be maintained in the frequency domain for each stream by multiplying each sub-sequence of the HE-LTF sequence by a different row of the P matrix for each stream.

Furthermore, as described above, an HE-LTF symbol in which a scrambled HE-LTF sequence is transmitted is determined by the number of streams allocated to UL MU transmission. As in the example of FIG. 17, orthogonality can be maintained in the time domain for each stream by multiplying the scrambled HE-LTF sequence mapped to each HE-LTF symbol by a different row of the P matrix for each stream.

1-C) CFO and Channel Estimation

A method for estimating a CFO and channel using an HE-LTF received by a reception end (i.e., an AP in the case of UL MU MIMO and/or UL OFDMA transmission) is described below.

P matrix code for a total of K streams (i.e., stream index k ($1 \le k \le K$)) is expressed in Equation 5.

$$c(1)=[11-11], \ldots ,c(K)=[-1111] \quad \text{[Equation 5]}$$

In Equation 5, since the case of the P_4×4 matrix has been assumed as described above, each of pieces of P matrix code is a 1×4 matrix, but the P matrix code for each stream may include a 1×K matrix if a P matrix is a K×K matrix.

If the HE-LTF is transmitted as in the example of FIG. 17, a signal Y(1) received by a reception end in a stream 1 in N_f (e.g., 4) subcarriers and N_p symbols (i.e., HE-LTF symbols) may be expressed as in Equation 6.

$$Y(1) = \begin{bmatrix} s_1(1)c_1(1)h_1(1)e^{j\theta(1)} & s_1(1)c_2(1)h_1(1)e^{j2\theta(1)} & \cdots & s_1(1)c_{N_p}(1)h_1(1)e^{jN_p\theta(1)} \\ s_2(1)c_1(1)h_2(1)e^{j\theta(1)} & s_2(1)c_2(1)h_2(1)e^{j2\theta(1)} & \cdots & s_2(1)c_{N_p}(1)h_2(1)e^{jN_p\theta(1)} \\ \vdots & \vdots & \ddots & \vdots \\ s_{N_f}(1)c_1(1)h_{N_f}(1)e^{j\theta(1)} & s_{N_f}(1)c_2(1)h_{N_f}(1)e^{j2\theta(1)} & \cdots & s_{N_f}(1)c_{N_p}(1)h_{N_f}(1)e^{jN_p\theta(1)} \end{bmatrix} =$$

[Equation 6]

$$\mathrm{diag}(h(1))s(1)c(1)\mathrm{diag}([e^{j\theta(1)} \ldots e^{jN_p\theta(1)}])$$

In Equation 6, h_i(k) (i.e., h_1(k), h_2(k), h_3(k), . . . ) indicates a channel from a transmission end to the reception end.

Furthermore, jθ(k) (i.e., θ(k), 2θ(k), 3θ(k), . . . ) indicates the phase of a signal received in each HE-LTF symbol. In this case, jθ(k) is expressed excluding "j" that expresses a complex number in Equation 6. In this case, "j" indicates a symbol index. That is, in the time domain, a CFO in the first HE-LTF symbol is increased twice in the second HE-LTF symbol, and a CFO in the first HE-LTF symbol is increased three times in the third HE-LTF symbol.

That is, the signal transmitted by the transmission end is transmitted to the reception end through a channel, thereby generating a phase difference in each symbol. A signal Y(1) received in a stream 1 may be expressed as the product of a channel h(1), a scrambled HE-LTF sequence S(1), P matrix code C(1), and phases [e^jθ(1), e^j2θ(1), . . . , e^jN_pθ(1)].

In this case, a channel diagonal matrix "diag(h(1)" may be expressed as an N_f×N_f matrix, s(1) may be expressed as an N_f×1 matrix, c(1) may be expressed as a 1×N_p matrix, and a phase diagonal matrix [e^jθ(1), e^j2θ(1), . . . , e^jN_pθ(1)] may be expressed an N_p×N_p matrix. Accordingly, the signal Y(1) received by the reception end in the stream 1 may be expressed as an N_f×N_P matrix. That is, in Equation 6, a row direction means a time axis, and a column direction means a frequency axis.

Equation 7 is obtained by superimposing signals received in a total number of K streams.

$$Y = \Sigma_k \mathrm{diag}(h(k))s(k)c(k)\mathrm{diag}([e^{j\theta(k)} \ldots e^{jN_p\theta(k)}])$$ [Equation 7]

FIG. 18 is a diagram illustrating a CFO estimation method according to an embodiment of the present invention.

Referring to FIG. 18, as in the description of FIG. 16, the HE-LTF sequences of respective streams have an orthogonal sequence in a unit of N_f subcarriers because the HE-LTF sequence is multiplied by different P matrix code in a unit of N_f continuous subcarriers and scrambled.

A channel in all of the N_f (e.g., 4) contiguous subcarriers may be roughly unchanged (i.e., correlated). Accordingly, the reception end can estimate a channel in each HE-LTF symbol in which an HE-LTF is transmitted, assuming that channel correlation is high in all of the N_f (e.g., 4) contiguous subcarriers as described above.

In contrast, a channel may be changed in various ways in the time domain due to a CFO. Accordingly, the reception end estimates a CFO by checking a phase difference between signals (i.e., HE-LTF sequences) transmitted in the HE-LTF symbols.

More specifically, first, the reception end removes a scrambled HE-LTF sequence and P matrix code from a signal received through the N_f contiguous subcarriers in an HE-LTF symbol "t" for each stream.

The stream 1 is described below. The reception end removes the HE-LTF sequence and the P matrix code from the signal Y(1) of the stream 1 received through the N_f contiguous subcarriers in the HE-LTF symbol "t" as in Equation 8.

$$c_t^*(1)s^H(1)Y_{.,t} = e^{jt\theta(1)}\Sigma_{f=1}^{N_f}h_f(1) + c_t^*(1)s^H(1)\Sigma_{k\neq 1}c_t(k)$$
$$e^{jt\theta(k)}\mathrm{diag}(h(k))s(k)$$ [Equation 8]

where t=1, . . . $N_P$

In Equation 8, c*_t(k) indicates the conjugate transpose matrix of the P matrix code for a stream k (k is a stream index). s^H(k) indicates the transpose matrix of the scrambled HE-LTF sequence for the stream k (k is a stream index).

Assuming that a channel has a high correlation over the N_f subcarriers in Equation 8, Equation 9 is obtained.

[Equation 9]

$$c_t^*(1)s^H(1)Y \approx N_f e^{jt\theta(1)}\tilde{h}(1) + c_t^*(1)\sum_{k\neq 1} c_t(k)e^{jt\theta(k)}\tilde{h}(k)\underbrace{s^H(1)s(k)}_{=0}$$

$$= N_f e^{jt\theta(1)}\tilde{h}(1)$$

where $\tilde{h}(k) = \sum_{f=1}^{N_f} h_f(k)$

In Equation 9, an HE-LTF sequence scrambled for each stream is orthogonal in a unit of N_f subcarriers. Accordingly, the results of S^H(1)×s(k) (k≠1) is 0, and thus signal components in all of other streams other than the stream 1 are removed.

If the above method is performed on a signal received in each stream in the same manner, signal components transmitted in all of other streams other than a corresponding stream can be removed from a specific HE-LTF symbol.

Furthermore, the reception end may derive phase rotation from a specific HE-LTF symbol for each HE-LTF symbol as in Equation 10.

$$\varphi_t(k) = \mathrm{phase}(e^{jt\theta(k)}\tilde{h}(k))$$ [Equation 10]

Furthermore, a CFO may be estimated from a phase difference between HE-LTF symbols as in Equation 11 based on a value derived from Equation 10.

$$\hat{\theta}(k) = \frac{E\{\varphi_{N_p}(k) - \varphi_1(k)\}}{N_p - 1}$$ [Equation 11]

A CFO correction term is derived as in Equation 12 based on the phase difference between the HE-LTF symbols derived by Equation 11.

$$\frac{1}{N_p} \sum_{t=1}^{N_p} e^{jt\hat{\theta}(k)} \qquad \text{[Equation 12]}$$

That is, the reception end derives a CFO estimation value for each stream as in Equation 12.

Furthermore, if the value derived by Equation 12 is applied to Equation 9, the reception end can estimate a channel (i.e., derive a channel estimation value ĥ(k)) for each HE-LTF symbol with respect to each stream.

2. A Method for Covering all of Numerologies (i.e., the Number of Available Tones) while Reusing an Existing P Matrix A problem of the method 1-A) is that an N_f value must be 2, 4, 6 or 8 if an existing P matrix is used.

However, all of the number of available tones different in bandwidths or OFDMA numerologies that are being taken into consideration in 802.11ax without taking into consideration an additional method cannot be covered by only the above values. For example, if the number of available tones expected in 40 MHz is 484, but an existing P matrix is reused, only a case where N_f is 2 or 4 is possible, and a case where N_f is 6 or 8 is not divided. Accordingly, a new technical approach regarding which method will be applied to the remaining tones to which a P matrix is not applied is required.

If N_f is 2 or 4, it means that a maximum number of supportable users (or the number of streams) is 2 or 4 for MU transmission. In order to cover 8 or more users (or streams) which may be taken into consideration in 11ax, a new P matrix, that is, a P matrix having a length of more than 8 (e.g., 11), needs to be defined.

However, the definition of the new P matrix may serve as overhead. For example, in order to cover all of numerologies which may be taken into consideration in 11ax in addition to a case where the length is 11 only, P matrices having various lengths must be defined. Accordingly, "No. 1 method" does not have a significant advantage. For this reason, a method capable of covering all of numerologies using an existing P matrix without defining a new P matrix is proposed as follows.

2-A) Apply the Method 1-A) after Excluding the Remaining Tones

If the remainder of an available tone (or subcarrier)/N_f is "r", the reception end may exclude r tones and generate an HE-LTF sequence by applying the method 1-A). Furthermore, the reception end may optionally apply the method 1-B) and may perform CFO measurement and channel estimation using the method 1-C). In this case, the available tone means a subcarrier to which an HE-LTF sequence may be mapped in a frequency domain allocated to a corresponding user.

Furthermore, in this case, the channel coefficients of the excluded tones maybe calculated using the channel state of surrounding tones (e.g., using an interpolation method or an extrapolation method).

In this case, the tones to be excluded may be located at any place. However, the utilization of the channels of the surrounding tones can be improved when the channels of the tones to be excluded are estimated if the tones to be excluded are located between tones to which the method 1-A) has been applied compared to a case where the tones to be excluded are located at edges in a frequency domain allo-cated to a corresponding user. Accordingly, more reliable results can be obtained in the channel estimation of the excluded tones.

FIG. 19 is a diagram illustrating a method for generating an HE-LTF sequence according to an embodiment of the present invention.

In FIG. 19, it is assumed that N_f is 4, the number of users participating in UL MU transmission is 2, and available tones (or subcarriers) are 26. Furthermore, it is assumed that a tone to which P_4×4 has not been applied is located at the last in a frequency domain.

Referring to FIG. 19, as in FIG. 16, an HE-LTF sequence is multiplied by the matrix elements of different rows of a P matrix for each stream in a unit of N_f (e.g., 4) subsequences.

Furthermore, if the remaining tones are smaller than the length of the P matrix (i.e., the column size of the P matrix) ("4" in the case of FIG. 19), the remaining HE-LTF sequences 1901 (i.e., L_25 and L_26) are not multiplied by the P matrix.

Furthermore, each user maps the HE-LTF sequence, generated as described above, to the subcarrier of an HE-LTF symbol. Furthermore, each user sends the HE-LTF sequence in HE-LTF symbols (4 symbols in the case of FIG. 19) having a number determined by the number of UL MU transmission streams.

In this case, optionally, in order to maintain orthogonality in the time domain as in the method 1-B), the data tone of each HE-LTF symbol may be multiplied by a different row of the P matrix for each stream.

The reception end may perform CFO measurement and channel estimation by applying the method 1-C) in the tones (L_1 to L_24 in FIG. 19) to which an HE-LTF sequence multiplied by P matrix code has been mapped.

However, channel estimation in the tone 1901 (i.e., L_25 and L_26) to which an HE-LTF sequence not multiplied by P matrix code has been mapped may be calculated using the channel state of a tone to which an HE-LTF sequence multiplied by P matrix code has been mapped.

For example, the channel estimation may be calculated using linear operation as in Equation 13.

$$h = \sum_i w_i h_i \qquad \text{[Equation 13]}$$

In Equation 13, "h" indicates the state of a channel to be obtained (i.e., a channel estimation value in a tone not multiplied by P matrix code). "i" indicates the index of a tone (i.e., "i" is the index of a tone to which an HE-LTF sequence multiplied by P matrix code has been mapped). "w_i" and "h_i" indicate a weight value and a channel state (i.e., a channel estimation value) in an i-th tone.

In this case, the weight may be set as a higher value because a correlation is higher adjacent tones.

For another example, the method may be identically applied to the following case. In the following case, each tone number illustrates the number of tones which may be used in an OFDMA method that is being taken into consideration in 11ax. Furthermore, the following example is a case where the 4×HE-LTF of 2× and 4×HE-LTFs whose length is two times or four times longer compared to the existing 11ac that is being taken into consideration in 11ax is used. This may be different if a 2×HE-LTF is used.

In the case of 52 tones, when a P matrix having a length of 6 or 8 is applied

In the case of 106 tones, when a P matrix having a length of 4, 6 or 8 is applied In the case of 107 tones, when a P matrix having a length of 2, 4, 6 or 8 is applied In the case of 108 tones, when a P matrix having a length of 8 is applied In the case of 242 tones, when a P matrix having a length of 4, 6 or 8 is applied In the case of 484 tones, when a P matrix having a length of 6 or 8 is applied In the case of 994 tones, when a P matrix having a length of 4, 6 or 8 is applied In the case of 996 tones when a P matrix having a length of 8 is applied 2-B) Apply the Method 1-A) after Using a P Matrix of a Different Length in the Remaining Tones If the remainder of available tones (or subcarriers)/N_f is "r", the reception end may generate an HE-LTF sequence by applying the method 1-A) in tones other than the r tones. Furthermore, the reception end performs CFO measurement and channel estimation by applying the method 1-A) using a P matrix suitable for a size of "r" in the r tones.

Furthermore, the reception end may optionally apply the method 1-B) and may perform CFO measurement and channel estimation using the method 1-C).

FIG. 20 is a diagram illustrating a method for generating an HE-LTF according to an embodiment of the present invention.

In FIG. 20, it is assumed that N_f is 4, the number of users participating in UL MU transmission is 2, and available tones (or subcarriers) are 26. Furthermore, it is assumed that a tone to which P_4×4 is not applied is located at the last in a frequency domain.

Referring to FIG. 20, as in FIG. 16, an HE-LTF sequence is multiplied by the matrix elements of different rows of a P matrix for each stream in a unit of N_f (e.g., 4) sub-sequences.

Furthermore, if the remaining tones are smaller than the length of the P matrix (i.e., the column size of the P matrix) ("4" in the case of FIG. 20), the remaining HE-LTF sequence elements 2001 (i.e., L_25 and L_26) are multiplied by P matrices having the same length as the number of remaining tones. That is, In the case of FIG. 20, since two tones remain, an HE-LTF sequence is generated by multiplying a row of P_2×2.

In this case, the remaining tones (i.e., r tones) need to be always contiguously located by the length of a P matrix that is applied (the remaining tones may be located at any place if they are contiguous by the length of the P matrix). Furthermore, the number of users participating in UL MU transmission may be covered by the smallest length or less (2 or less in the example of FIG. 20) of a P matrix applied to generate an HE-LTF sequence.

Furthermore, each user maps the HE-LTF sequence, generated as described above, to the subcarriers of an HE-LTF symbol. In this case, the HE-LTF sequence is transmitted in HE-LTF symbols having a number (e.g., 2 symbols in the case of FIG. 20) determined by the number of UL MU transmission streams.

In this case, optionally, in order to maintain orthogonality in the time domain as in the method 1-B), the data tone of each HE-LTF symbol may be additionally multiplied by a different row of the P matrix for each stream.

A reception end may perform CFO measurement and channel estimation by applying the method 1-C) based on the length of the P matrix by which the HE-LTF sequence has been multiplied. That is, since P_4×4 has been applied to the tones L_1 to L_24, the reception end may perform CFO measurement and channel estimation every 4 tones assuming that a channel correlation is high. Since P_2×2 has been applied to the tones L_25 and L_26, the reception end may perform CFO measurement and channel estimation every 2 tones assuming that a channel correlation is high.

For example, the above method may be applied to the following cases. In the following description, the number of tones illustrates the number of tones which may be used in an OFDMA method being taken into consideration in 11ax. In the following cases, the 4×HE-LTF of 2× and 4×HE-LTFs whose length is two times or four times longer compared to the existing 11ac being taken into consideration in 11ax.

In the case of 26 tones, when a P matrix having a length of 4, 6 or 8 is applied, a P matrix having a length of 2 may be applied to the remaining tones. In this case, the number of users must be 2 or less.

In the case of 52 tones, when a P matrix having a length of 6 or 8 is applied, a P matrix having a length of 2 or 4 may be applied to the remaining tones. In this case, the number of users must be 2 or 4 or less in either case.

In the case of 106 tones, when a P matrix having a length of 4 or 8 is applied, a P matrix having a length of 2 may be applied to the remaining tones. In this case, the number of users must be 2 or less.

In the case of 106 tones, when a P matrix having a length of 6 is applied, a P matrix having a length of 2 or 4 may be applied to the remaining tones. In this case, the number of users must be 2 or 4 or less in either case.

In the case of 108 tones, when a P matrix having a length of 8 is applied, a P matrix having a length of 2 or 4 may be applied to the remaining tones. In this case, the number of users must be 2 or 4 or less in either case.

In the case of 242 tones, when a P matrix having a length of 4, 6 or 8 is applied, a P matrix having a length of 2 may be applied to the remaining tones. In this case, the number of users must be 2 or less.

In the case of 484 tones, when a P matrix having a length of 6 or 8 is applied, a P matrix having a length of 2 or 4 may be applied to the remaining tones. In this case, the number of users must be 2 or 4 or less in either case.

In the case of 994 tones, when a P matrix having a length of 4 or 8 is applied, a P matrix having a length of 2 may be applied to the remaining tones. In this case, the number of users must be 2 or less.

In the case of 994 tones, when a P matrix having a length of 6 is applied, a P matrix having a length of 2 or 4 may be applied to the remaining tones. In this case, the number of users must be 2 or 4 or less in either case.

In the case of 996 tones, when a P matrix having a length of 8 is applied, a P matrix having a length of 2 or 4 may be applied to the remaining tones. In this case, the number of users must be 2 or 4 or less in either case.

In this case, however, the number of users covered with respect to UL MU transmission is inevitably limited depending on the length of a P matrix applied to the remaining r tones. Accordingly, unlike in the case, a P matrix in which the remainder of available tones (or subcarriers)/N_f is "0" may be used for all of tones. For example, in the case of 26 tones, a P matrix having a length of 2 may be applied to an HE-LTF sequence with respect to all of the tones. Such a method may be applied to other tones.

2-C) Apply "No. 1 Method" after Using P Matrices Having Various Lengths

P matrices of 2, 4, 6 or 8 lengths other than one length may be combined, and an HE-LTF sequence may be generated by applying the method 1-A). Furthermore, optionally, the method 1-B) may be applied, and CFO measurement and channel estimation may be performed using the method 1-C).

In this case, the number of users participating in UL MU transmission must be smaller than a minimum length of a P matrix applied to an HE-LTF (i.e., a P matrix by which an HE-LTF sequence is multiplied). In other words, only P matrices having a length equal to or greater than the number of users participating in UL MU transmission may be applied.

For example, if two users use 26 tones in a situation in which they perform UL MU transmission (i.e., if the two users perform UL MU MIMO transmission in 26 tones or each of the two users performs UL OFDMA transmission in 26 tones), they may use a P matrix having a length of 8 once, may use a P matrix having a length of 6 once, may use a P matrix having a length of 4 twice, and may use a P matrix having a length of 2 twice.

In addition, various combinations are possible depending on the number of available tones. Furthermore, the location where an HE-LTF is multiplied by each P matrix is not limited. That is, an HE-LTF sequence may be multiplied by P matrices of various combined lengths in any sequence.

Furthermore, each user maps the HE-LTF sequence, generated as described above, to the subcarriers of an HE-LTF symbol. Furthermore, the HE-LTF sequence is transmitted in HE-LTF symbols having a number determined by the number of UL MU transmission streams.

In this case, optionally, in order to maintain orthogonality in the time domain as in the method 1-B), the data tones of each HE-LTF symbol are additionally multiplied by a different row of the P matrix for each stream.

A reception end may perform CFO measurement and channel estimation by applying the method 1-C) based on the length of the P matrix by which the HE-LTF sequence has been multiplied.

Furthermore, the number of tones to which such a method may be applied is not limited. For example, the number of tones used for UL MU transmission may be applied to the cases of 52, 106, 107, 108, 242, 484, 994 or 996 tones in the same manner.

Furthermore, the method 2-C) may be combined with the method 2-A). That is, if P matrices of 2, 4, 6 or 8 lengths other than single length are combined and applied, when the remaining tones are present, transmission may be performed without applying the P matrix to the remaining tones as in the method 2-A).

2-D) Use Cyclic Orthogonality of a P Matrix

Furthermore, an embodiment of the present invention proposes a method for performing channel estimation and CFO measurement more precisely by fully exploiting all of tones without a tone from which the application of a P matrix is excluded using the cyclic orthogonality of the P matrix.

FIG. 21 is a diagram illustrating a method for generating an HE-LTF according to an embodiment of the present invention.

In FIG. 21, it is assumed that N_f is 4, the number of users participating in UL MU transmission is 2, and available tones (or subcarriers) are 26.

Referring to FIG. 21, an HE-LTF sequence is multiplied by the matrix elements of a different row of a P matrix in a unit of N_f (e.g., 4) sub-sequences for each stream as in FIG. 16.

Furthermore, if the last remaining tones are smaller than the length of the P matrix (i.e., the column size of the P matrix ("4" in the case of FIG. 21)), a P matrix value is cyclically allocated to the last two tones. That is, in FIG. 21, the last remaining HE-LTF sequence element 2101 (i.e., L_25 and L_26) is multiplied by a matrix element (i.e., the value of the P matrix by which L_21 and L_22 have been multiplied) sequentially from the first element of the row of the P matrix.

Furthermore, each user maps an HE-LTF sequence, generated as described above, to the subcarriers of an HE-LTF symbol. Furthermore, the HE-LTF sequence is transmitted in HE-LTF symbols having a number (e.g., 4 symbols in the case of FIG. 21) determined by the number of UL MU transmission streams.

In this case, optionally, in order to maintain orthogonality in the time domain as in the method 1-B), the data tones of each HE-LTF symbol may be additionally multiplied by a different row of the P matrix for each stream.

A reception end may perform CFO measurement and channel estimation by applying the method 1-C) in the same manner for each tone block to which the P matrix has been applied. That is, the reception end may calculate a channel and CFO estimation value for each tone block, such as (L_1, L_2, L_3, L_4), (L_5, L_6, L_7, L_8), . . . , (L_21, L_22, L_23, L_24) and (L_23, L_24, L_25, L_26).

The reception end can measure a channel and a CFO by applying the equation of the method 1-C) because orthogonality is maintained in each user from the twenty-third tone (i.e., L_23) of a user 1 and a user 2 to the twenty-sixth tone (i.e., L_26) of the user 1 and the user 2 by cyclically applying the P matrix as described above.

In this case, the location of the remaining tones to which the P matrix is cyclically applied is not limited to any place in available tones.

As in the example of FIG. 21, the P matrix may be cyclically applied to the last tone location, but the P matrix may be cyclically applied to the foremost part. That is, at the foremost part, an HE-LTF sequence element may be sequentially multiplied by matrix elements from the last element of the row of the P matrix. For example, if L_3, L_4, L_5 and L_6 are multiplied by the row of the P matrix, if L_1 and L_2 are multiplied by the value of the P matrix by which L_5 and L_6 have been multiplied, orthogonality can be maintained for each user from the first tone (i.e., L_1) to the fourth tone (i.e., L_4).

Furthermore, an HE-LTF sequence may be configured by multiplying a P matrix so that tones remain both at the first and last. For example, (L_2, L_3, L_4, L_5) to (L_22, L_23, L_24, L_25) may be multiplied by the row of a P_4×4 matrix. That is, the last remaining HE-LTF sequence element may be multiplied by matrix elements sequentially from the first element of the row of the P matrix, and an HE-LTF sequence element at the foremost part may be sequentially multiplied by matrix elements from the last element of the row of the P matrix. That is, L_26 left over in the above example may be multiplied by the value of a P matrix by which L_22 has been multiplied, and L_1 left over in the above example may be multiplied by the value of a P matrix by which L_5 has been multiplied. Even in this case, orthogonality can be maintained for each user using the cyclic orthogonality of the P matrix.

The number of tones to which this method may be applied is not limited. For example, the number of tones used for UL MU transmission may be applied to 52, 106, 107, 108, 242, 484, 994 or 996 tones in the same manner.

Furthermore, the method 2-D) may be combined with the method 2-C). For example, if P matrices of various lengths are combined as in the method 2-C), the P matrices may be cyclically applied to remaining tones using the method 2-D).

Furthermore, upon calculation for CFO and channel estimation, subcarriers may not be divided and calculated for each tone block (i.e., L_1~L_4, L_5~L_8, L_9~L_12, ...) to which a P matrix has been applied as in FIG. 21. This is described below with reference to the drawing.

FIG. 22 is a diagram illustrating a method for estimating a CFO and channel according to an embodiment of the present invention.

In FIG. 22, it is assumed that N_f is 4, the number of users participating in UL MU transmission is 2, and available tones (or subcarriers) are 26.

Referring to FIG. 22, a CFO and a channel may be calculated for each tone block, such as L_1~L_4, L_2~L_5, L_3~L_6, ..., using the cyclic orthogonality of a P matrix. If such a tone block is used, there is an advantage in that the accuracy of CFO and channel estimation can be improved because the number of samples for the CFO and channel estimation is increased.

Furthermore, in FIG. 22, tone blocks have been classified based on a piece of tone spacing, but the present invention is not limited thereto. That is, unlike in the above example, tone blocks may be set using 2 or 3 pieces of tone spacing.

Such a method may be used if P matrices having the same length are continuously applied. The number of tones to which this method may be applied is not limited. For example, the number of tones used for UL MU transmission may be applied to 52, 106, 107, 108, 242, 484, 994 or 996 tones in the same manner.

In addition, upon channel estimation in the example of FIG. 22, the final channel coefficient corresponding to each tone may be calculated through linear operation in which weight has been added to a channel coefficient derived for each tone block as in Equation 14.

$$h = \sum_i w_i h_i \quad \text{[Equation 14]}$$

In Equation 14, "h" indicates a channel state (i.e., a channel estimation value) to be calculated. "i" indicates a tone block index. "w_i" and "h_i" indicate a weight value and channel state (i.e., channel estimation value) of an i-th tone block.

In this case, the weight may be set as a greater value because a correlation increases between adjacent tones.

Furthermore, if an HE-LTF sequence is generated using the aforementioned cyclic orthogonality, various advantages can be obtained from several viewpoints when the P matrix having a length of 8 (i.e., P_8×8) is used. Accordingly, a method for applying only P_8×8 is additionally proposed.

If P_8×8 is used, up to 8 users can be covered. Furthermore, P_8×8 may operate as a case where N_f is 4 if the number of users is 4 or less because P_8×8 includes an orthogonal P_4×4 sub-matrix (i.e., because it is P_4×4 Hadamard). Furthermore, P_8×8 may operate as a case where N_f is 2, if the number of users is 2 or less because P_8×8 includes an orthogonal 2×2 sub-matrix.

In this case, if the number of users is 4 or less, only the four rows (e.g., from the first row to the fourth row or from the fifth row to the eighth row) of a P matrix must be applied for orthogonality.

Furthermore, likewise, if the number of users is 2 or less, only the two rows (e.g., the first row and the second row (or the third row and the fourth row, the fifth row and the sixth row, or the seventh row and the eighth row) of a P matrix must be applied for orthogonality.

That is, there is proposed a method in which a P matrix having a length of 8 is fixed and applied in all of situations (in all of bandwidths and in all of resource units of OFDMA) and which operates in a mode in which N_f is 8 if the number of users participating in UL MU transmission is 5 to 8, operates in a mode in which N_f is 4 if the number of users participating in UL MU transmission is 4 or less, and operates in a mode in which N_f is 3 if the number of users participating in UL MU transmission is 3 or less.

3. A Method for Maintaining the Number of Supportable Users without any Change while Reducing N_f to a Maximum Extent A CFO can be mathematically measured only when adjacent N_f tones have the same channel state in the method 1-C). Accordingly, the method 1-C) may not have a significant advantage if a channel correlation between adjacent N_f tones is not great in a frequency domain.

In this case, an N_f value cannot be unlimitedly reduced because the method can support the number of UL MU transmission users corresponding to the N_f value. An embodiment of the present invention further proposes a new method capable of maintaining the number of users supportable for UL MU transmission without any change while increasing the accuracy of channel estimation by reducing N_f.

Users are classified into several groups, a user group-specific LTF tone is allocated to each group, an HE-LTF sequence is generated by applying "No. 2 method" between users belonging to the same group, and CFO measurement and channel estimation are performed.

In this case, the number of groups may include a total number of users supported for UL MU transmission. That is, one user may belong to each group.

Furthermore, the number of users (or the number of streams) within a group may vary depending on the setting of an N_f value, and the number of users (or the number of streams) within a group may support a maximum of N_f.

Furthermore, this method proposes a structure in which each user can cover all of tones within an HE-LTF symbol by changing the location of tones allocated to each group after N_f HE-LTF symbols (or the number of users within a group) of a total number of HE-LTF symbols. In this case, the total number of HE-LTF symbols may be determined by the number of users belonging to all of groups (or the number of streams allocated to all of the groups).

As described above, the reason why each user has to cover all of tones is for channel estimation. The reason why the location of tones allocated to each group is changed for each HE-LTF symbol that belongs to a total number of HE-LTF symbols and that is based on the number of users belonging to each group is for CFO measurement.

FIG. 23 is a diagram illustrating a method for generating an HE-LTF sequence according to an embodiment of the present invention.

In FIG. 23, it is assumed that the number of user groups is 2, the number of users belonging to each group is 2, N_f is 2, and available tones (or subcarriers) are 26.

For example, if a total of four users (users 1 to 4) are supported as in FIG. 23, if N_f is set to 2, a maximum of two users can be supported for each group. For example, if users are classified into two groups as in FIG. 23, a user 1 and a user 2 may be set as a group 1 and a user 3 and a user 4 may be set as a group 2.

If each of four users sends one stream, a total of 4 HE-LTF symbols are present.

Furthermore, if available tones are 26, up to the former 13 tones 2301 of first and second HE-LTF symbols may be allocated to the group 1 (i.e., the users 1 and 2), and the remaining tones 2302 may be allocated to the group 2 (i.e., the users 3 and 4).

However, the present invention is not limited to the example, and different tones may be allocated to each group. For example, 13 tones may be allocated to the group 1 like L_1 to L_6 and L_14 to L_20, and 13 tones may be allocated to the group 2 like L_7 to L_13 and L_21 to L_26.

In this case, each user may set an LTF value to "0" in a tone not allocated to a group to which the corresponding user belongs, and may perform transmission using power to be used in a tone set to "0" in a tone allocated to a group to which the corresponding user belongs.

Furthermore, third and fourth HE-LTF symbols are opposite the first and second HE-LTF symbols. That is, up to the former 13 tones 2304 may be allocated to the group 2 (i.e., the users 3 and 4), and the remaining tones 2303 may be allocated to the group 1 (i.e., the users 1 and 2).

In this case, each user may cover all of the tones, and the channels of all of the tones can be measured by applying "No. 2 method." Furthermore, channel estimation performance can also be improved because $N\_f$ can be set to be small compared to No. 1 method or No. 2 method.

Furthermore, in the above example, CFO measurement may be obtained through a phase difference between the first and the second HE-LTF symbols and between the third and the fourth HE-LTF symbols.

The method has an advantage in that it can improve channel estimation performance, but has a disadvantage in that the number of samples used when a CFO is calculated is reduced by a reverse multiple of the number of groups. However, reliable performance in CFO measurement can be guaranteed because transmission is performed in each sample using greater power per tone compared to No. 1 method or No. 2 method.

The number of tones to which the method may be applied is not limited. For example, the number of tones used for UL MU transmission may be applied to 52, 106, 107, 108, 242, 484, 994 or 996 tones in the same manner.

FIG. 24 is a diagram illustrating a method for uplink multi-user transmission according to an embodiment of the present invention.

Referring to FIG. 24, a wireless apparatus (AP or non-AP STA) generates an HE-LTF sequence by applying (i.e., multiplying) a P matrix to a predefined sequence in a unit of sub-sequence (i.e., the length of the P matrix of one row) in a frequency domain according to an UL MU transmission bandwidth (S2401).

In this case, the wireless apparatus may generate the HE-LTF sequence using one or more of the 1-A), 2-A), 2-B), 2-C) and 2-D) methods and/or No. 3 method. More specifically, if the method 2-D) is used, if a remaining sequence is present by dividing a predefined sequence by the length of one row of the P matrix, the remaining sequence may be multiplied by the cyclically shifted matrix elements of one row of the P matrix. That is, the HE-LTF sequence may be generated using the cyclic orthogonality of the P matrix.

The wireless apparatus applies one row of the P matrix to one or more HE-LTF symbols to which the generated HE-LTF sequence is mapped (S2402). That is, the wireless apparatus applies the P matrix to the data tones of each HE-LTF symbol to which the generated HE-LTF sequence is mapped.

In this case, the wireless apparatus may apply one row of the P matrix to each HE-LTF symbol using the method 1-B).

The wireless apparatus sends a PPDU including the one or more HE-LTF symbols (S2403).

In this case, the PPDU may be configured to have one of the formats illustrated in FIGS. 12 to 15.

General Apparatus to which the Present Invention May be Applied

FIG. 25 is a block diagram exemplifying a wireless apparatus according to an embodiment of the present invention.

Referring to FIG. 25, an apparatus 2510 according to the present invention may include a processor 2511, a memory 2512, and a radio frequency (RF) unit 2513. The apparatus 2510 may be an AP or a non-AP STA for implementing the embodiments of the present invention.

The RF unit 2513 is connected to the processor 2511 to transmit and/or receive a wireless signal. For example, the RF unit 2513 may implement the physical layer according to the IEEE 802.11 system.

The processor 2511 is connected to the RF unit 2513 to implement the physical layer and/or MAC layer according to the IEEE 802.11 system. The processor 2511 may be configured to perform the operations according to the various embodiments of the present invention according to FIGS. 1 to 24. In addition, a module that implements the operations of the AP and/or the STA according to the various embodiments of the present invention according to FIGS. 1 to 24 may be stored in the memory 2512 and executed by the processor 2511.

The memory 2512 is connected to the processor 2511 and stores various pieces of information for driving the processor 2511. The memory 2512 may be included in the processor 2511 or installed exterior to the processor 2511 and connected to the processor 2511 by known means.

Furthermore, the apparatus 2510 may have a single antenna or multiple antennas.

The detailed configuration of the apparatus 2510 may be implemented such that the features described in various embodiments of the present invention described above are independently applied or two or more embodiments are simultaneously applied.

FIG. 26 is a detailed diagram illustrating the processor of FIG. 25 according to an embodiment of the present invention.

FIG. 26 is a more detailed diagram of a controller if the apparatus 2510 of FIG. 25 operates as a reception end.

The controller may include an LTF sequence unscrambler 2601, a CFO estimator 2602, and a legacy channel estimator 2603 using P matrix dispreading.

The LTF sequence unscrambler 2601 unscrambles an HE-LTF sequence from a signal received from one or more wireless apparatuses.

That is, as in the method 1-C), the LTF sequence unscrambler 2601 may remove (i.e., unscramble) the HE-LTF sequence and P matrix code (i.e., one row of a P matrix) applied to the HE-LTF sequence from the received signal using Equation 8.

The CFO estimator 2602 estimates a CFO, if necessary.

The CFO estimator 2602 may estimate the CFO based on a phase difference between symbols in which the received signal has been transmitted. More specifically, the CFO estimator 2602 may estimate the CFO assuming that channels are the same for each subcarrier of length of the P matrix code (i.e., one row of the P matrix).

That is, as in the method 1-C), the CFO estimator 2602 may extract a signal from each stream using Equation 9, assuming that channels have a high correlation in $N\_f$ subcarriers. Furthermore, the CFO estimator 2602 may derive phase rotation for each HE-LTF symbol using Equation 10, and may derive a CFO estimation value using Equation 12 based on a phase difference between derived HE-LTF symbols using Equation 11.

The legacy channel estimator 2603 using P matrix dispreading performs channel estimation using P matrix dispreading.

That is, as in the method 1-C), the legacy channel estimator 2603 using P matrix dispreading may derive a channel estimation value for each HE-LTF symbol with respect to each stream by applying the CFO estimation value, derived by Equation 12, to Equation 9.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present invention by coupling a part of the elements and/or technical features. The order of operations described in the embodiments of the present invention may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present invention may be implemented by various means, for example, hardware, firmware, software and the combination thereof. In the case of the hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present invention may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the inventions. Therefore, the detailed description is not limited to the embodiments described above, but should be considered as examples. The scope of the present invention should be determined by reasonable interpretation of the attached claims, and all modification within the scope of equivalence should be included in the scope of the present invention.

INDUSTRIAL APPLICABILITY

In the wireless communication system, the example in which the uplink multi-user transmission and reception method is applied to the IEEE 802.11 system is primarily described, but the uplink multi-user transmission method can be applied to various wireless communication systems in addition to the IEEE 802.11 system.

What is claimed is:

1. A method for performing, by a station (STA) apparatus, multi-user (MU) transmission in a wireless communication system, the method comprising:
generating a physical protocol data unit (PPDU) including a data field and plural signal fields; and
transmitting the PPDU to another STA,
wherein the PPDU further comprises one or more long training field (LTF) symbols for at least one of synchronization or channel estimation,
wherein the LTF symbols are generated based on a LTF sequence that is generated in a frequency domain according to an MU transmission bandwidth by multiplying a predefined sequence with one row of a predefined matrix,
wherein the predefined sequence having a plurality of equal length first parts of the predefined sequence and a second part of the predefined sequence that is remaining part,
wherein the second part of the predefined sequence is shorter than any of the first parts of the predefined sequence,
wherein the LTF sequence comprises a first part of the LTF sequence concatenated with a second part of the LTF sequence,
wherein the first part of the LTF sequence is generated by multiplying the plurality of equal length first parts of the predefined sequence by all elements of the one row of the predefined matrix in order to generate a plurality of concatenated elements,
wherein the predefined matrix is a matrix of M rows and M columns (M=natural number) having orthogonality between each of rows,
wherein the second part of the LTF sequence is generated by multiplying the second part of the predefined sequence by only a subset of the one row of the predefined matrix, the subset of the one row of the predefined matrix consisting of a number of consecutive first elements corresponding a number of elements in the second part of the predefined sequence, and
wherein each row of the predefined matrix multiplied by the predefined sequence is applied to corresponding different STAs.

2. The method of claim 1, wherein the transmitted LTF sequence consists of non-zero elements of the LTF sequence.

3. The method of claim 1, wherein the length of the predefined matrix is fixed to 8 regardless of a number of time-spatial streams allocated for the MU transmission.

4. The method of claim 1, wherein the length of the predefined matrix has a combination of one or more of 2, 4 and 8.

5. The method of claim 1, wherein the method is used for a carrier frequency offset and channel estimation in a unit of tones multiplied by the one row of the predefined matrix.

6. The method of claim 1, wherein the method is used for a carrier frequency offset and channel estimation in a unit of tones having specific tone intervals regardless in a unit of tones multiplied by the one row of the predefined matrix.

7. The method of claim 1, wherein tones for a mapping of the LTF sequence are classified and allocated for each group within the MU transmission bandwidth.

8. The method of claim 7, wherein the tones for the mapping of the LTF sequence are differently allocated after a number of symbols corresponding to a number of STAs within the group among the one or more LTF symbols.

9. The method of claim 1, wherein the predefined sequence is multiplied by different rows of the predefined matrix for each time-spatial stream.

10. The method of claim 1, wherein the predefined matrix is defined by a following equation:

$$P_{8\times 8} = \begin{bmatrix} P_{4\times 4} & P_{4\times 4} \\ P_{4\times 4} & -P_{4\times 4} \end{bmatrix},$$

$$\text{where } P_{4\times 4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix}.$$

11. A station (STA) apparatus performing multi-user (MU) transmission in a wireless communication system, the STA apparatus comprising:
a radio frequency (RF) unit configured to send or receive a radio signal; and
a processor configured to control the RF unit,
wherein the processor is configured to
generate a physical protocol data unit (PPDU) including a data field and plural signal fields; and
transmit the PPDU to another STA,
wherein the PPDU further comprises one or more long training field (LTF) symbols for at least one of synchronization or channel estimation
wherein the LTF symbols are generated based on a LTF sequence that is generated in a frequency domain according to an MU transmission bandwidth by multiplying a predefined sequence with one row of a predefined matrix,
wherein the predefined sequence having a plurality of equal length first parts of the predefined sequence and a second part of the predefined sequence that is remaining part,
wherein the second part of the predefined sequence is shorter than any of the first parts of the predefined sequence,
wherein the LTF sequence comprises a first part of the LTF sequence concatenated with a second part of the LTF sequence,
wherein the second part of the LTF sequence is shorter than the first part of the LTF sequence,
wherein the first part of the LTF sequence is generated by multiplying the plurality of equal length first parts of the predefined sequence by all elements of the one row of the predefined matrix in order to generate a plurality of concatenated elements,
wherein the predefined matrix is a matrix of M rows and M columns (M=natural number) having orthogonality between each of rows,
wherein the second part of the LTF sequence is generated by multiplying the second part of the predefined sequence by only a subset of the one row of the predefined matrix, the subset of the one row of the predefined matrix consisting of a number of consecutive first elements corresponding a number of elements in the second part of the predefined sequence, and
wherein each row of the predefined matrix multiplied by the predefined sequence is applied to corresponding different STAs.

* * * * *